(12) United States Patent
Hart

(10) Patent No.: US 10,661,763 B2
(45) Date of Patent: May 26, 2020

(54) TRAILER LANDING GEAR APPARATUS

(71) Applicant: Glenn Hart, Lehigh Acres, FL (US)

(72) Inventor: Glenn Hart, Lehigh Acres, FL (US)

(*) Notice: Subject to any disclaimer, the term of this patent is extended or adjusted under 35 U.S.C. 154(b) by 0 days.

(21) Appl. No.: 15/923,220

(22) Filed: Mar. 16, 2018

(65) Prior Publication Data
US 2019/0283718 A1  Sep. 19, 2019

(51) Int. Cl.
*B60S 9/04* (2006.01)
*B60D 1/66* (2006.01)

(52) U.S. Cl.
CPC . *B60S 9/04* (2013.01); *B60D 1/66* (2013.01)

(58) Field of Classification Search
CPC .................................. B60S 9/04; B60D 1/66
USPC ...................................... 280/766.1
See application file for complete search history.

(56) References Cited

U.S. PATENT DOCUMENTS

| | | | | |
|---|---|---|---|---|
| 4,345,779 A * | 8/1982 | Busby | ....................... | B60S 9/20 280/766.1 |
| 7,163,207 B2 * | 1/2007 | Baird | ....................... | B60P 1/56 254/419 |
| 8,590,417 B1 * | 11/2013 | Bono | ..................... | G05G 1/085 254/419 |
| 2002/0053794 A1 * | 5/2002 | Fender | ...................... | B60S 9/08 280/766.1 |
| 2013/0264806 A1 * | 10/2013 | Collins | ..................... | B60S 9/04 280/766.1 |
| 2017/0001603 A1 * | 1/2017 | Chen | ................... | B25B 23/0078 |

\* cited by examiner

*Primary Examiner* — John D Walters
(74) *Attorney, Agent, or Firm* — Joe D. Calhoun

(57) ABSTRACT

An apparatus providing rotational power to the crank shaft actuating the lowering and raising of legs for supporting a load bearing vehicle. The apparatus includes a means for providing rotational force to the crank shaft comprising a battery powered motorized drill having a drive shaft having a plurality of rotational directions, and a motor housing. Also included is a crank shaft coupler adapted for removable attachment to the crank shaft, comprising an adaptor end having a non-round cross-section, and an attachment end defining a cavity snugly accepting the crank shaft and including a pair of apertures aligned with a transverse bore through the crank shaft through which a lock pin is inserted. Also included is a drive shaft coupler for coupling said drive shaft to said crank shaft coupler, comprising a shank end tightly accepted within the chuck of said drill, and a coupler end defining a cavity snugly accepting said adaptor end having a non-round cross-section; also a means for preventing rotation of said means for providing rotational force to the crank shaft comprising a bridge between said motor housing and the load bearing vehicle, said housing including at least one lateral handle having a distal end supporting a bridge arm for contacting the load bearing vehicle and preventing rotation of said drill.

17 Claims, 28 Drawing Sheets

TRAILER LANDING GEAR APPARATUS

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to mechanisms for raising and lowering vertical supports. More particularly, the invention disclosed herein relates to mechanisms for simultaneously raising and lowering the pair of legs supporting the front portion of a trailer or other load bearing vehicle, when not attached to a tractor or otherwise supported by another support.

(2) Background of the Invention

Large trucks with attached trailers, such as (for example) via a "$5^{th}$ wheel" attachment, are the primary target of this invention. Also included are rolling dollies attachable beneath the underside of the front of a free-standing trailer (known in the trucking industry as a "pup"), to support the trailer in the absence of a tractor and to allow attachment behind a trailer already attached to a tractor for pulling in tandem. In this instance, a jack is typically used to raise/lower the dolly's trailer-connection apparatus, to connect to the trailer. Such jacks use a similar crankshaft mechanism as the trailer landing gear legs. The disclosed invention will eliminate the physical hand cranking that has been necessary to raise and lower the trailer legs (or dolly trailer-connection apparatus) when a trailer is being connected to or disconnected.

Currently there is a hand crank mechanism attached to every trailer. These typically use planetary gears to raise/lower legs which stabilize the front of a trailer when not attached to a tractor. This mechanism works on both legs at the same time via a direct shaft which has a hand crank connected to it. This shaft typically has a low gear/high gear mechanism based on sliding the shaft in/out which activates the appropriate gear.

Since a driver typically will drop a trailer and then attach another trailer, when dropping the trailer he/she will do the least amount of work possible. That is he/she will crank until the legs are "down", which effectively means a minimal weight transference occurs (which driver recognizes via work effort increasing when cranking). The driver will then pull the tractor from underneath the trailer and the $5^{th}$ wheels will be jarred when trailer legs impact the ground.

The driver that comes to attach to this trailer, which was dropped by another driver, then has to be careful to ensure it cranks the trailer legs up enough to ensure the $5^{th}$ wheel goes under the trailer and not into the front face of the trailer.

The torque required to be generated on the landing gear driveshaft is approximately 90 pounds when trailer is fully loaded utilizing legal weight limits. This torque must be controlled to ensure that a driver is not injured when using the drill when maximum torque is needed.

Known is U.S. Pat. No. 6,010,154 issued to Payne discloses a drill for raising or lowering the landing gear, or legs, on a trailer. However, that patent does not disclose any means for preventing rotation of the drill which could injure users or bystanders, or otherwise detract from the utility of the device. Moreover, that patent does not disclose any means for preventing rotation of the drill until after the drill's drive shaft is coupled to the crank shaft of the landing gear, or until completion of the means for preventing rotation of the drill.

SUMMARY OF THE INVENTION

In general, the invention disclosed herein includes (comprises) an apparatus providing rotational power to the crank shaft actuating the lowering and raising of legs supporting a trailer or other load bearing vehicle. The apparatus may include a means for providing rotational force to the crank shaft, and a means for preventing rotation of the means for providing rotational force to the crank shaft (also known herein as a "stabilization means").

One primary benefit of the disclosed invention is to provide a relatively light weight and mobile motorized means for lowering and raising support legs of a trailer, making it unnecessary to manually lower or raise the support legs.

Another benefit of the disclosed invention is to provide a motorized means for lowering and raising landing gear legs, without requiring the user to absorb or resist the torque exerted during the mechanical process of lowering or lowering the landing gear legs.

Other benefits and objects of the disclosed invention will become apparent upon the full reading of this disclosure.

BRIEF DESCRIPTION OF THE DRAWINGS

The novel features believed characteristic of the disclosed subject matter will be set forth in the claims of this application. The disclosed subject matter itself, however, as well as a preferred mode of use, further objectives, and advantages thereof, will best be understood by reference to the following detailed description of illustrative embodiments when read in conjunction with the accompanying drawings.

DETAILED DESCRIPTION OF THE INVENTION

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element.

The disclosure herein is not limited by construction material(s) to the extent that such materials satisfy the structural and/or functional requirements. For example, any material may be used so long as it satisfies the rigid structural and functional requirements for which it is being used.

In general, the invention disclosed herein comprises (includes) an apparatus providing rotational power to the crank shaft actuating the lowering and raising of landing gear legs for supporting a trailer or other load bearing vehicle. The apparatus may include a means for providing rotational force to the crank shaft, and a stabilization means.

The means for providing rotational force to the crank shaft may include:

(a) a motorized torque-producing device rotating a drive shaft and having a motor housing; and (b) a crank shaft coupler adapted for removable attachment to the crank shaft, typically a free end thereof.

Figure 10:
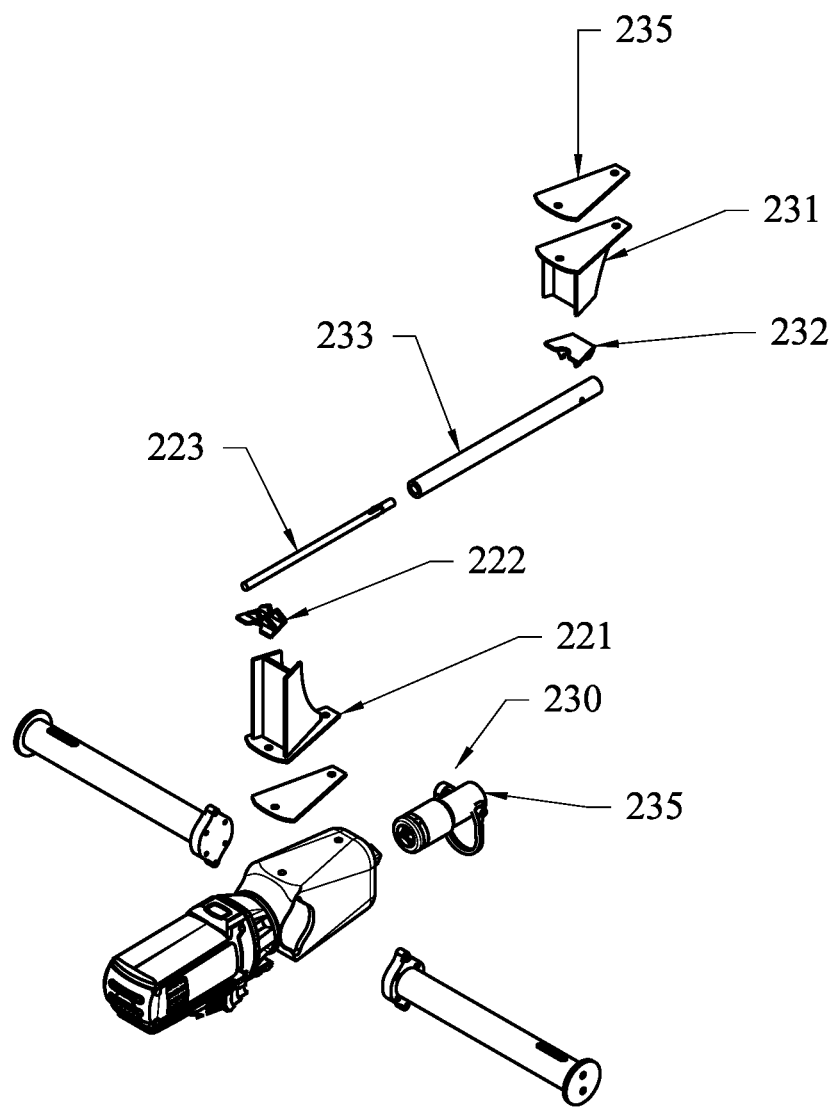
FIG. 10 is a partially exploded view of the embodiment of FIG. 9, showing the crank shaft coupler's (230) drive shaft coupling end and adaptor end, the drive shaft coupler's shank end (213) and crank shaft coupling end (235), the extension arm integrally extending from top of the housing of the means of providing rotational force, and the bridge tube (233) mounted on the load bearing vehicle.
Figure 11:
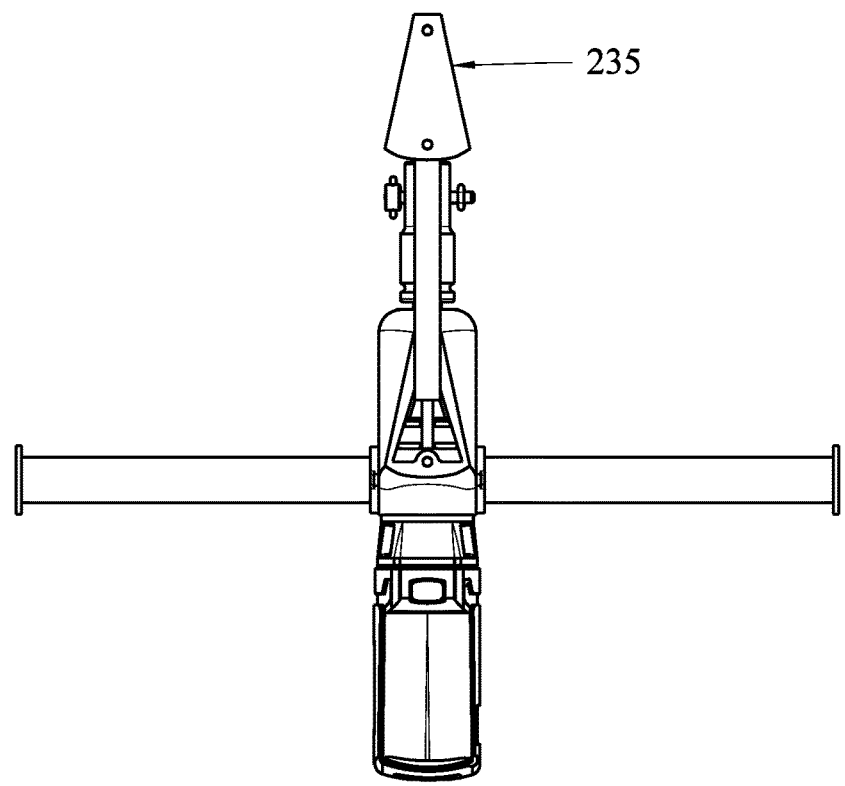
FIG. 11 is a top plan view of the embodiment of FIG. 9.
Figure 12:
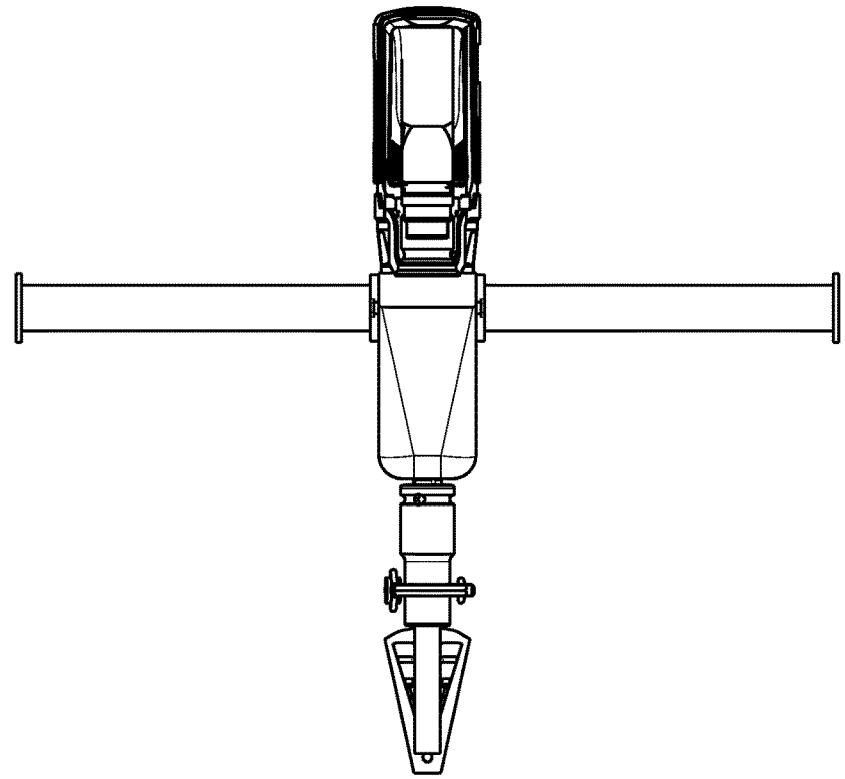
FIG. 12 is a bottom plan view of the embodiment of FIG. 9.
Figure 13:
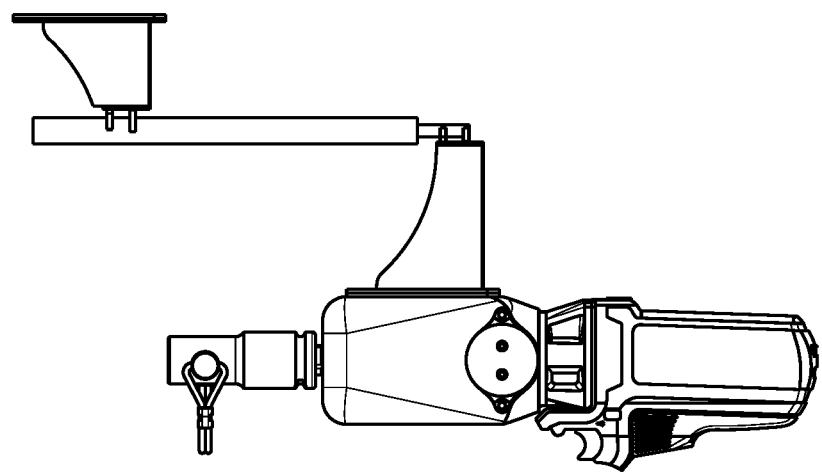
FIG. 13 is a left side elevation view of the embodiment of FIG. 9.
Figure 14:
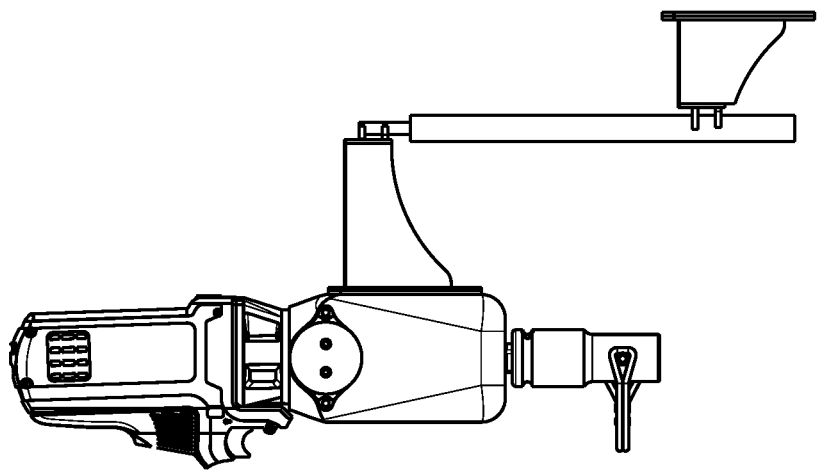
FIG. 14 is a right side elevation view of the embodiment of FIG. 9.
Figure 15:
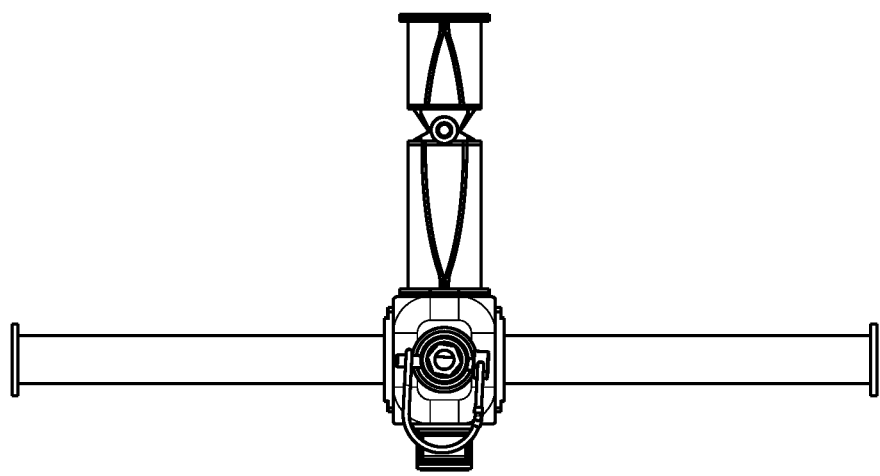
FIG. 15 is a front view of the embodiment of FIG. 9.
Figure 16:
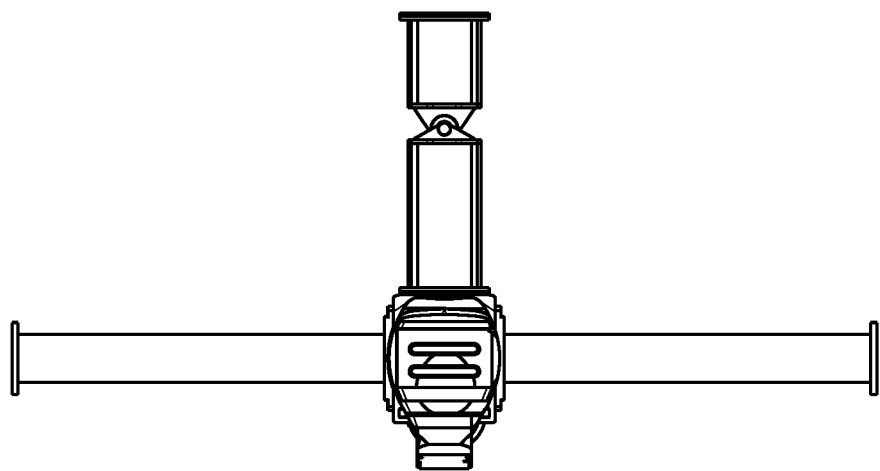
FIG. 16 is a rear view of the embodiment of FIG. 9.
Figure 17:
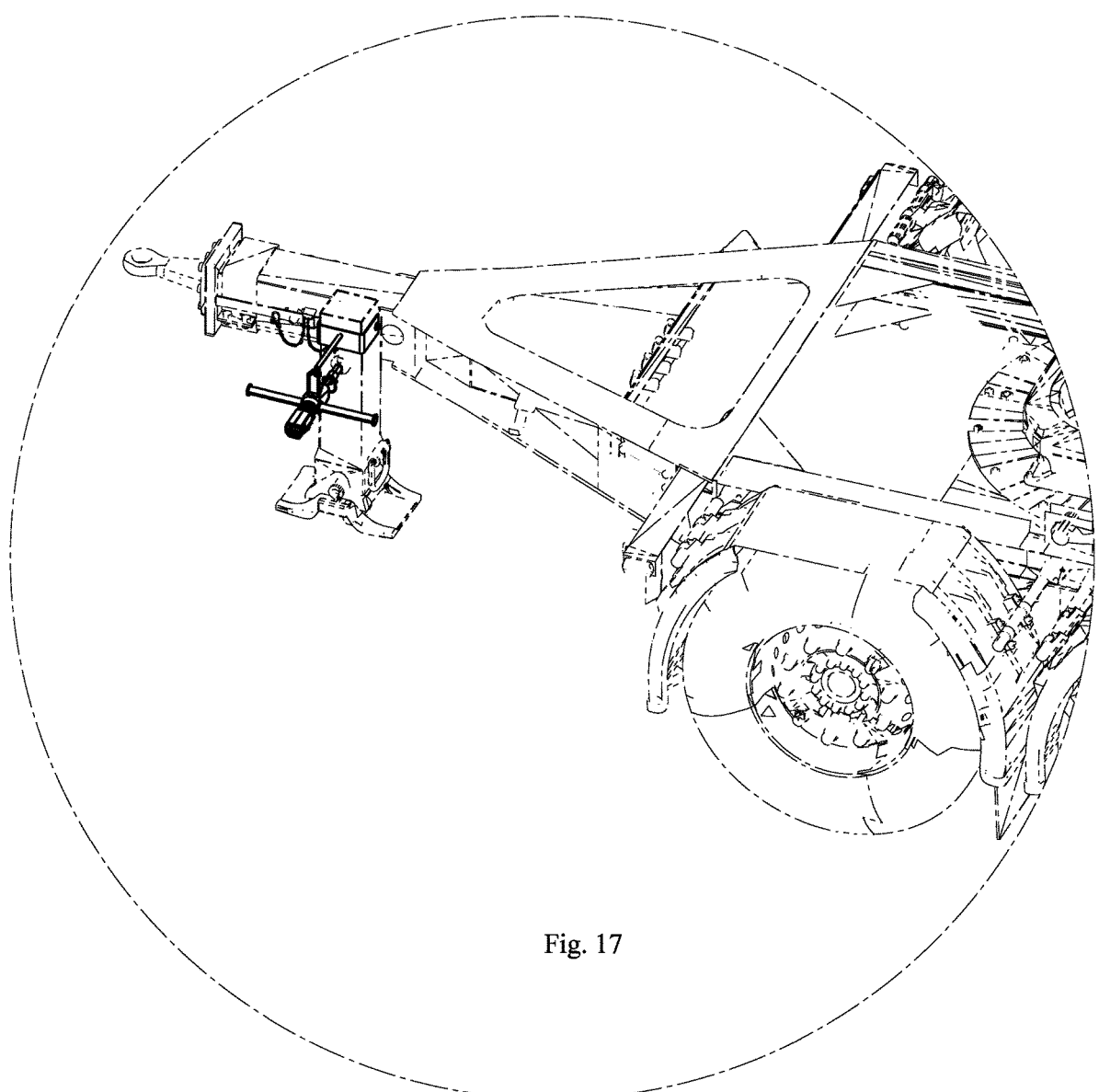
FIG. 17 is a perspective view of representative sample of another embodiment of the motorized means for lowering and raising the front (or nose) of a converter dolly.
Figure 34:
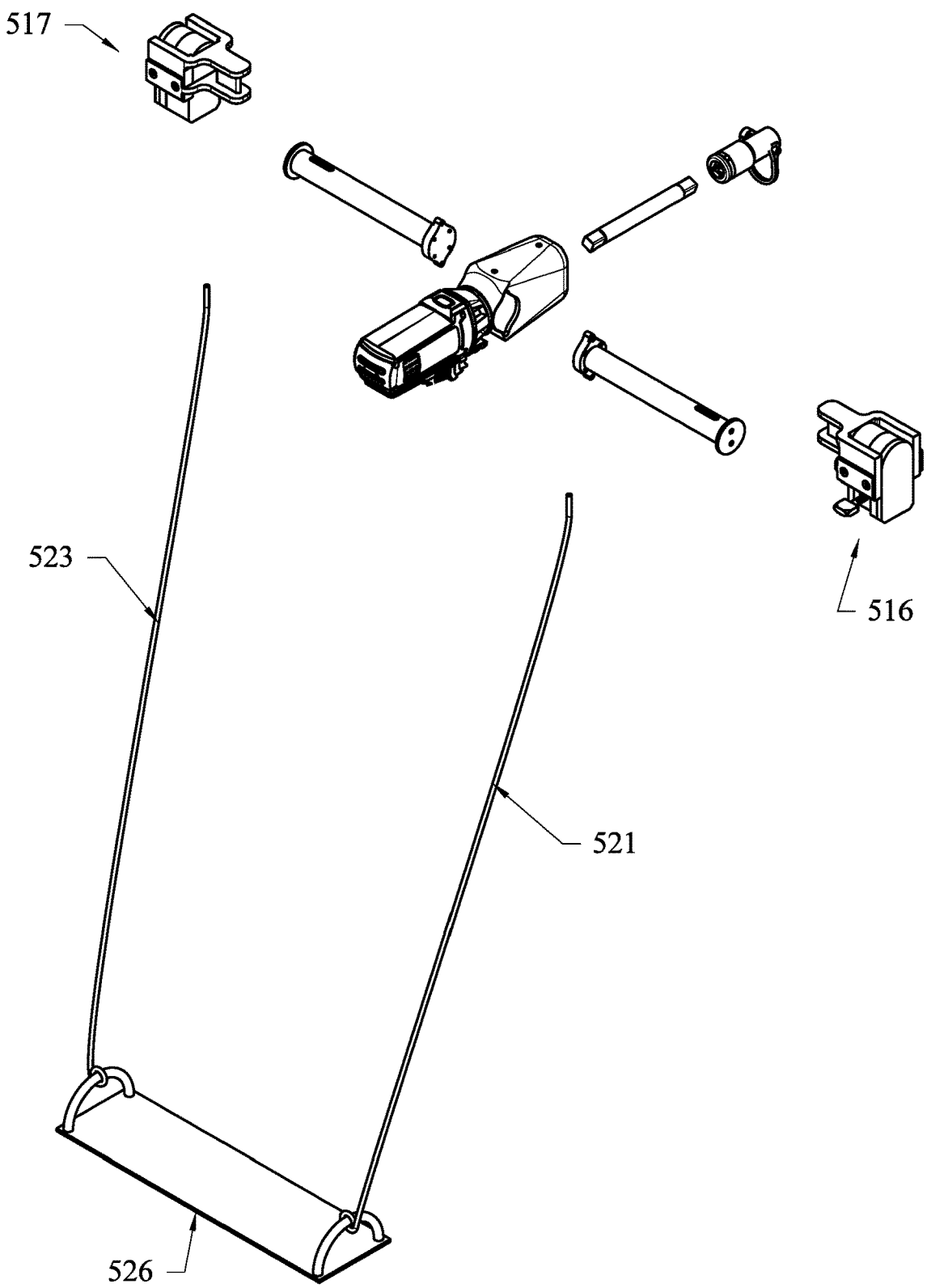
FIG. 34 is an exploded view of the embodiment of FIG. 33, showing the motorized means having a drive shaft with a crank shaft adaptor end (for fastening to the jack crank shaft via a lock pin inserted through aligned transverse bores in both) and, on each opposite handle, having a spool (516 and 517) carrying a stabilizer cable (521 and 523) terminating in a connector means such as a foot plate (526). The user locks the motorized means onto the crankshaft, then extends both cables to the appropriate anchor point (such as the ground or a position beneath the trailer), then locks the cable spool and commences raising or lowering the support legs of the trailer.
Figure 35:
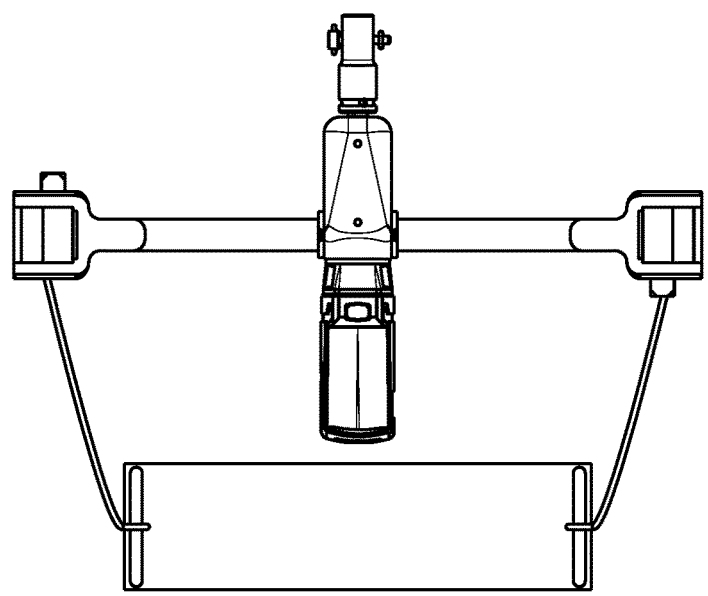
FIG. 35 is a top plan view of the embodiment of FIG. 33.
Figure 36:
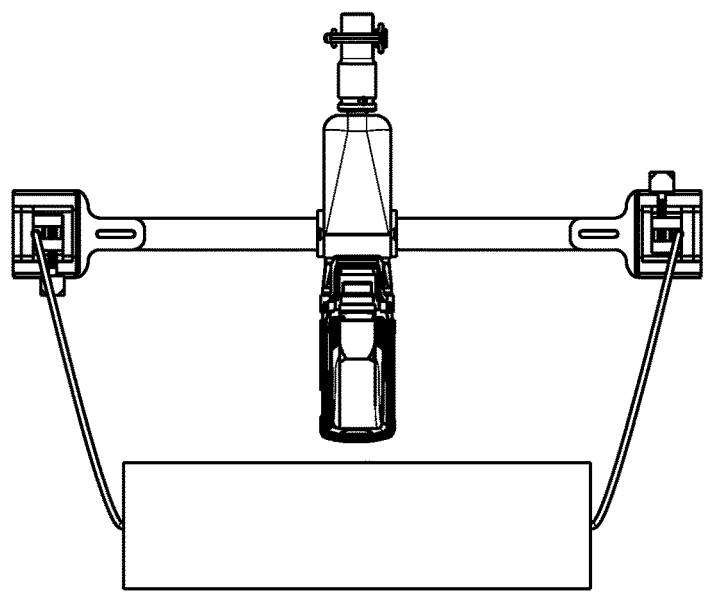
FIG. 36 is a bottom plan view of the embodiment of FIG. 33.
Figure 37:
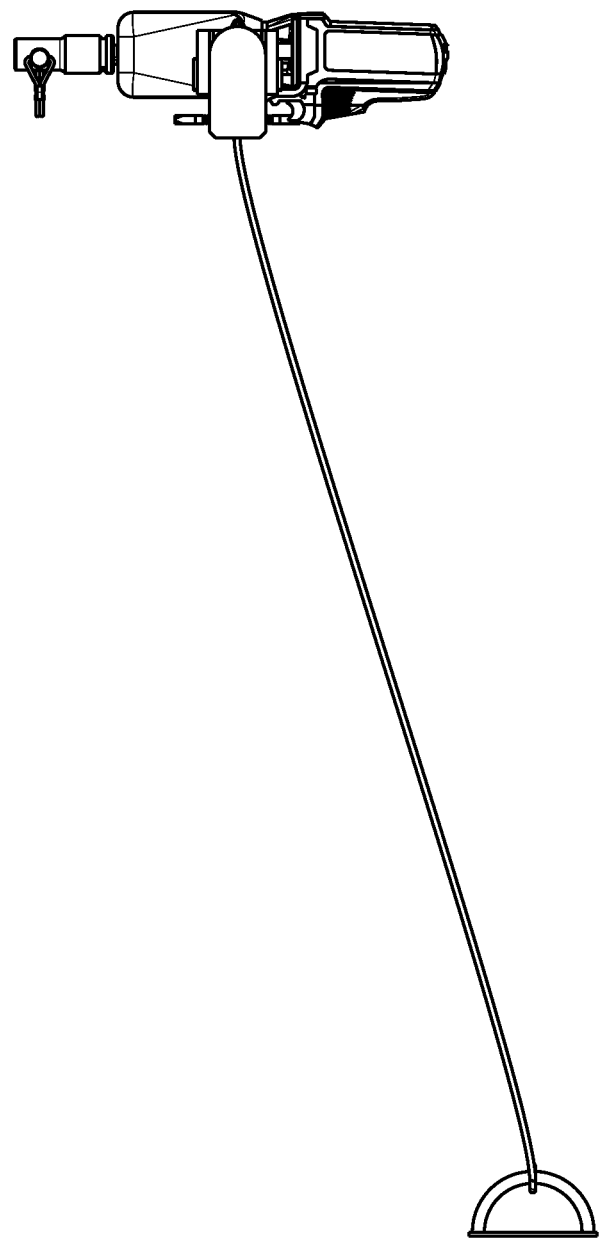
FIG. 37 is a left side elevation view of the embodiment of FIG. 33.
Figure 38:
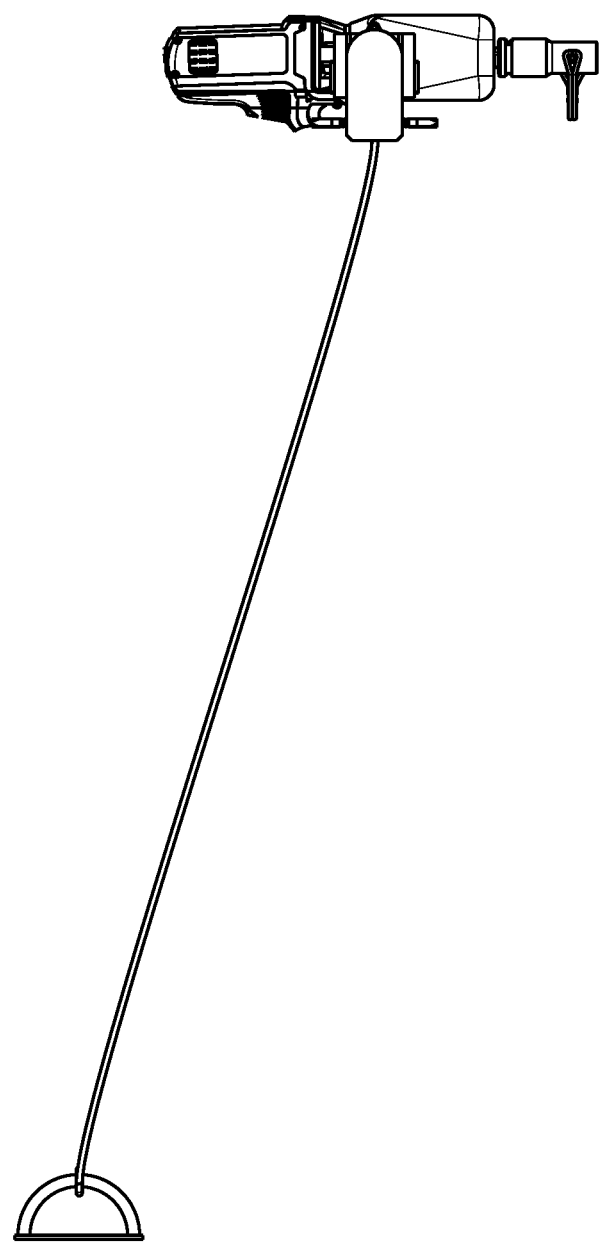
FIG. 38 is a right side elevation view of the embodiment of FIG. 33.
Figure 39:
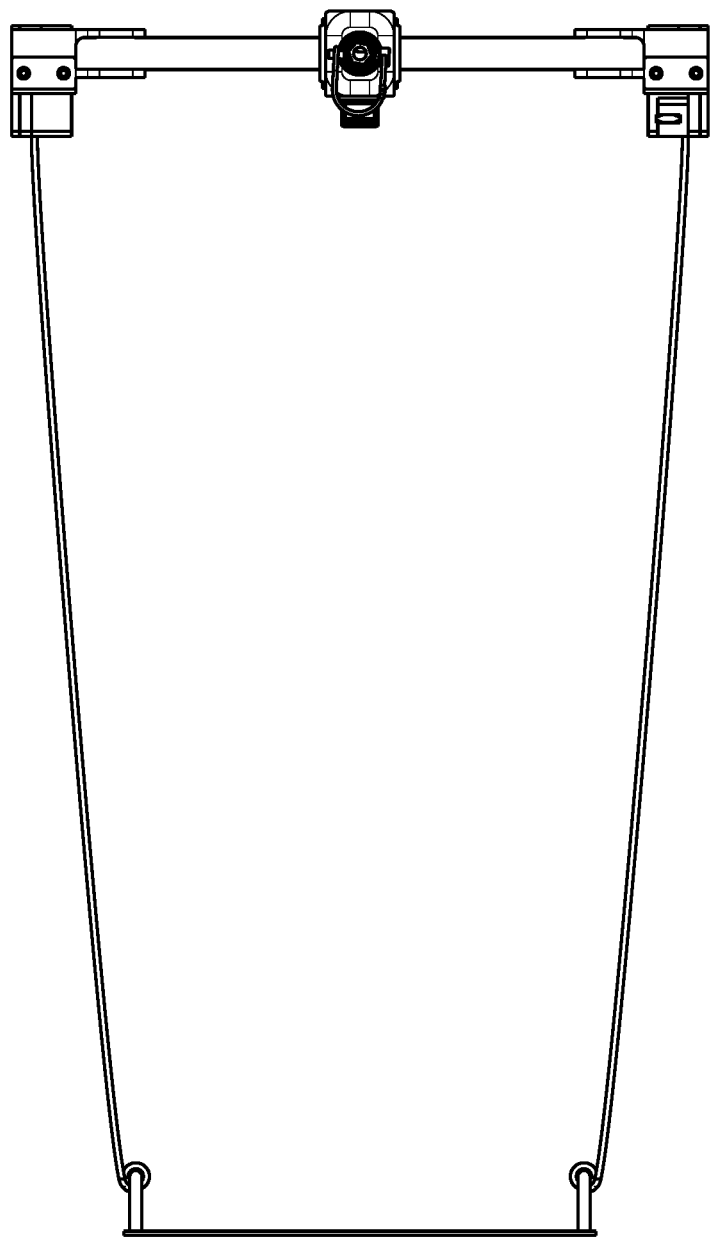
FIG. 39 is a rear view of the embodiment of FIG. 33.
Figure 40:
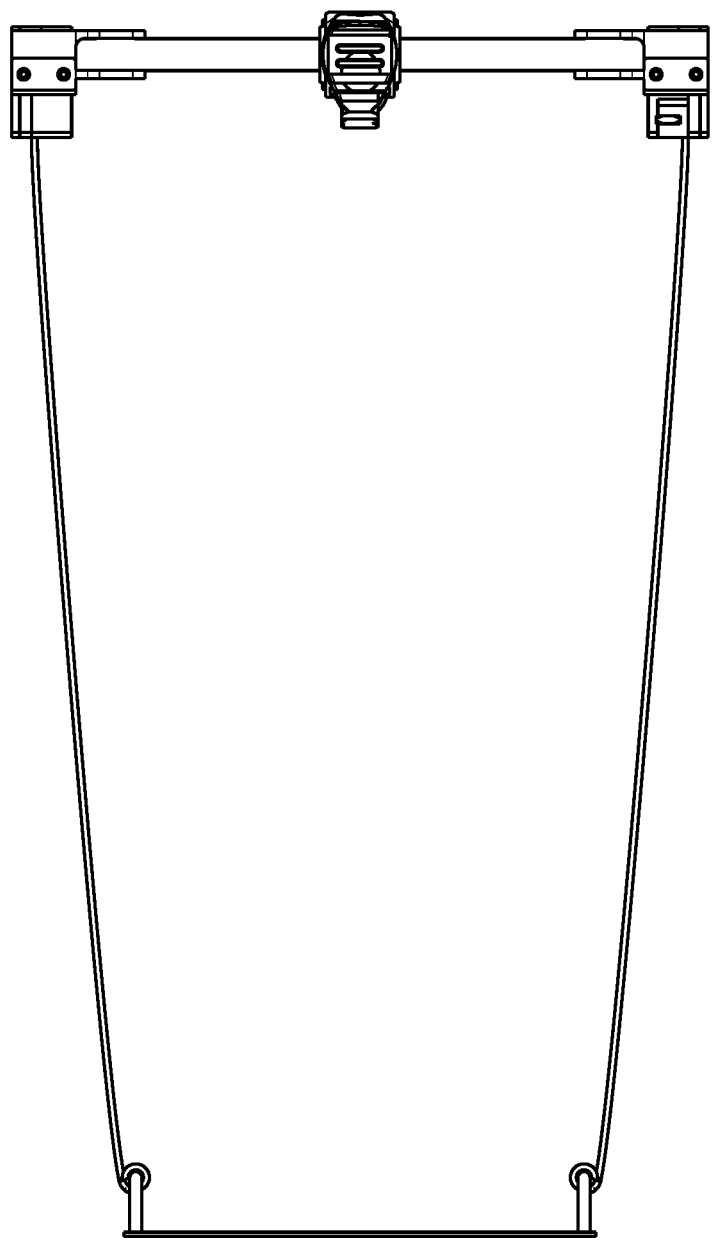
FIG. 40 is a front view of the embodiment of FIG. 33.

There may be a variety of mechanisms for transferring the rotary force of the motorized torque-producing device to the crank shaft; any such mechanism will suffice so long as it satisfies the functional requirements needed to rotate the crank shaft. For example, the apparatus may have all functioning parts integrally combined into a single-piece apparatus, having a rotating end couplable to the crank shaft. Alternatively, the apparatus may have two separate components. For example, the rotational motor and rotary drive shaft combined into a single unit, and a second component comprising an adaptor having one end adapted for coupling to the free end of the drive shaft and having an opposite end adapted for coupling to the crank shaft. (See FIG. 10.) Another 2-component embodiment may comprise the rotational motor as a single unit (having a rotational chuck-type end), and a second component comprising a drive shaft ending in (integral with) an adaptor having a free end adapted for coupling to the crank shaft. (See FIG. 18.) Another mechanism may include three separate components; for example, a rotational motor unit with a chuck end, a drive shaft capturable within the chuck end, and an adaptor having one end adapted for coupling to the free end of the drive shaft and having an opposite end adapted for coupling to the crank shaft. (See FIG. 34.)

One embodiment includes an apparatus wherein the means for providing rotational force to the crank shaft comprises a motorized torque device having a drive shaft and a motor housing, and a crank shaft coupler having a crank shaft coupling end adapted for removable coupling with a free end of the crank shaft. In another embodiment, the crank shaft coupler further comprises a drive shaft coupling end adapted for removable coupling with the drive shaft. The drive shaft comprises a distal (free) end having a non-round cross-section, and the drive shaft coupling end of the crank shaft coupler defines a cavity snugly accepting the distal end of the drive shaft; moreover, the crank shaft coupling end of the crank shaft coupler defines a cavity snugly accepting the free end of the crank shaft for crank shaft coupling.

The crank shaft coupling end of the crank shaft coupler preferably comprises a pair of apertures aligned with a transverse bore through the free end of the crank shaft, through which a lock pin is inserted. Other means for locking the coupling of the crank shaft and the motorized torque device may be deployed.

In another embodiment, the motorized torque device comprising a drill having a chuck end rotationally powered by the drill motor; the drive shaft coupling end of the crank shaft coupler comprises a shank end tightly confined within the chuck. And the crank shaft coupling end of the crank shaft coupler defines a cavity snugly accepting the free end of the crank shaft. The crank shaft coupling end further comprises a pair of apertures aligned with a transverse bore through the free end of the crank shaft through which a lock pin is inserted for locked coupling.

At least the distal end of the drive shaft preferably has a cross-section selected from the group consisting of an oval, triangular, square, rectangular, pentagonal, hexagonal, octagonal or other polygonal cross-section, or combinations thereof.

The motorized torque device ideally comprises a battery powered drill-like device having a plurality of rotational speeds and directions of torquing rotation. While ideally a portable solution is most often battery powered, it can be powered by other means such as an electrical, solar, hydraulic, water pressure, air pressure, steam or any other means of powering a motor.

In another embodiment, the stabilization means comprising a bridge between the motorized torque device and the load bearing vehicle. This provides a stabilizing connection preventing rotation of the means for providing rotational force to the crank shaft. Otherwise, resistance by the crank shaft (to rotation) may cause the motorized torque device to rotate rather than the (crank shaft), possibly causing injury to the user or bystander(s), or possibly causing damage to the device.

In one embodiment, the bridge comprises a rigid support member mounted on the motorized torque device, and extending to engagement with the load bearing vehicle. The rigid support member may comprise a bridge arm extending from the motor housing and having a distal end; the stabilization means may further comprise a bridge receptacle anchored to the load bearing vehicle, and having an opening sized to receive the bridge arm distal end.

In another embodiment, the motorized torque device may include at least one lateral handle having a distal portion supporting a bridge arm extending to engagement with the load bearing vehicle, and preventing rotation of the motorized torque device. The stabilization means may further comprise a bridge receptacle anchored to the load bearing vehicle, and having an opening sized to receive the bridge arm engagement and preventing rotation of the motorized torque device. The motorized torque device ideally may include an opposite pair of lateral handles, each having a distal portion supporting a separate bridge arm extending to engagement with the load bearing vehicle, and preventing rotation of the motorized torque device.

In another embodiment, the bridge may comprise a flexible elongate support member mounted on the motorized torque device, and extend to the load bearing vehicle or to the ground for anchoring thereto. The motorized torque device may include at least one lateral handle having a distal portion supporting a flexible elongate support member (such as a cable, rope or strap) attached thereto, and extending to the ground or to the load bearing vehicle for anchoring thereto. Ideally the motorized torque device includes an opposite pair of lateral handles, each having a distal portion supporting a separate flexible elongate support member attached thereto, and extending to the ground or to the load bearing vehicle for anchoring thereto and preventing rotation of the motorized torque device.

Another embodiment may further comprise a fail-safe means for preventing actuation of the means for providing rotational force to the crank shaft, until the locked coupling and/or the stabilizing connection occurs. In one embodiment, the fail-safe means may comprise a normally-open electrical circuit which is closed by the locked coupling and/or stabilizing connection. For example, the fail-safe mechanism may include two components which, combined, prevent the rotational force device from operating if the stabilization rod or tube on the rotational force device is not inserted into the stabilization tube attached to the trailer. The mechanism may be engineered to require a certain distance of insertion of the rotational force device's stabilization tube into the stabilization tube attached to the trailer, for example, a minimum of 2 inches. For example, the rotational force device may have a normally-open electrical circuit which is closed when a switch is closed. In one such instance, a normally-open switch (along the motor's circuit) is inserted into a stabilization tube attached to the housing of the rotational force device. The switch closes the circuit when a button on the component is depressed. The button may protrude through a hole in the side of the rotational force device's stabilization tube, two inches (for example) from the end that will be inserted into a stabilization tube attached to the trailer. Accordingly, insertion of the rotational force device's stabilization tube at least two inches into the trailer's stabilization tube will cause the button to depress and thereby close the electrical circuit of the motor, thereby allowing actuation of the rotational force device.

Another example may include a connector that plugs into the rotational force device to close circuit at that point. This may be used when a trailer does not have the stabilization tube attached.

An alternative fail-safe mechanism my include a normally-open switch mechanism insertable into the stabilization tube attached to the trailer, which would be closed by insertion of the stabilization rod a certain distance into the stabilization tube. hole would exist on the tube allowing for the "lever mechanism" or "button" to protrude outside of the tube. This hole would exist 2 inches from the end of the drill torque tube, thereby ensuring a minimum of 2 inches tube/tube insertion has been accomplished to allow for the torque to be transmitted from drill to the trailer. This lever/button would be depressed by the trailer torque tube and close the circuit to allow the drill to operate.

One particular embodiment includes an apparatus providing rotational power to a free end of a crank shaft actuating the lowering and raising of legs for supporting a load bearing vehicle, comprising:

(a) a means for providing rotational force to the crank shaft comprising:

(1) a battery powered motorized drill having a drive shaft with a chuck end and having a plurality of rotational directions, and a motor housing;

(2) a crank shaft coupler comprising a shank end tightly confined within the chuck, and a crank shaft coupling end defining a cavity snugly accepting the free end of the crank shaft, the crank shaft coupling end further comprising a pair of apertures aligned with a transverse bore through the free end of the crank shaft through which a lock pin is inserted for locked coupling; and (3) a stabilization means, comprising a bridge between the motorized drill and the load bearing vehicle and providing a stabilizing connection preventing rotation of the means for providing rotational force to the crank shaft.

The bridge may include at least one lateral handle having a distal end supporting a bridge arm for contacting the load bearing vehicle and preventing rotation of the drill. Ideally the motorized drill further comprises an opposite pair of lateral handles, each having a distal end supporting a separate bridge arm. The bridge may comprise a flexible elongate support member mounted on the motorized torque device and extending to the load bearing vehicle or to the ground for anchoring thereto. The apparatus may further include a fail-safe means for preventing actuation of the means for providing rotational force to the crank shaft, comprising an open electrical circuit which is closed by the locked coupling and/or stabilizing connection.

The crank shaft coupler may include a drive shaft coupling end having a non-round cross-section, and a crank shaft coupling end defining a cavity snugly accepting the crank shaft and including a pair of apertures aligned with a transverse bore through the crank shaft through which an anchor pin is inserted.

The drive shaft coupler may include a shank end tightly anchored within the chuck of the drill, and a free end either having a non-round cross-section (for coupling with a separate crank shaft coupler) or having a free end functioning as the crank shaft coupler.

Ideally the motorized torque-producing device may include a motorized drill; more particularly, a battery powered drill having a plurality of rotational speeds and directions. It should have sufficient torque production to turn the crank shaft to raise or lower the legs of the load bearing vehicle such as a trailer or a dolly for attaching and pulling trailers in tandem. Typically this requires at least about 100 ft/lbs torque at a minimum, produced in continuous (drill) mode. Ideally it will have both forward and reverse torque-production capabilities. The drill device could be variable controlled by the operator and operate from 100 rpm to 600 rpm; or 1 speed, preferably in the lower end of that range. The output drive shaft may be in the form of a standard chuck mechanism, accepting a standard size shank such as (for example) ¼ inch.

While ideally a portable solution is most often battery powered, it can be powered by other means such as an electrical, solar, hydraulic, water pressure, air pressure, steam or any other means of powering a motor.

Ideally the motor housing will be metal, or of sufficiently rigid materials to perform its function of bracing the drill against the trailer or other load bearing vehicle, so that the torque of the rotary drill is directed at the landing gear crank shaft rather than absorbed by the user.

The stabilization means may include a bridge between the motor housing and the trailer. At a minimum, the housing preferably includes at least one lateral stabilizer handle having a distal end supporting a bridge arm for contacting the trailer and preventing rotation of the drill. In some embodiments, the housing preferably will include an opposite pair of lateral stabilizer handles, each having a distal end supporting a separate bridge arm for contacting the trailer and preventing rotation of the drill.

In an alternative embodiment, the housing preferably includes at least one lateral stabilizer handle having a distal end supporting an extension arm; the bridge may include a tube mounted on the trailer, and having an end accepting insertion of the extension arm and preventing rotation of the drill. In other embodiments, the housing preferably includes an opposite pair of lateral stabilizer handles, each having a distal end supporting a separate extension arm, each bridge may include a tube mounted on the trailer and having an end accepting insertion of the extension arm and preventing rotation of the drill.

Figure 1:
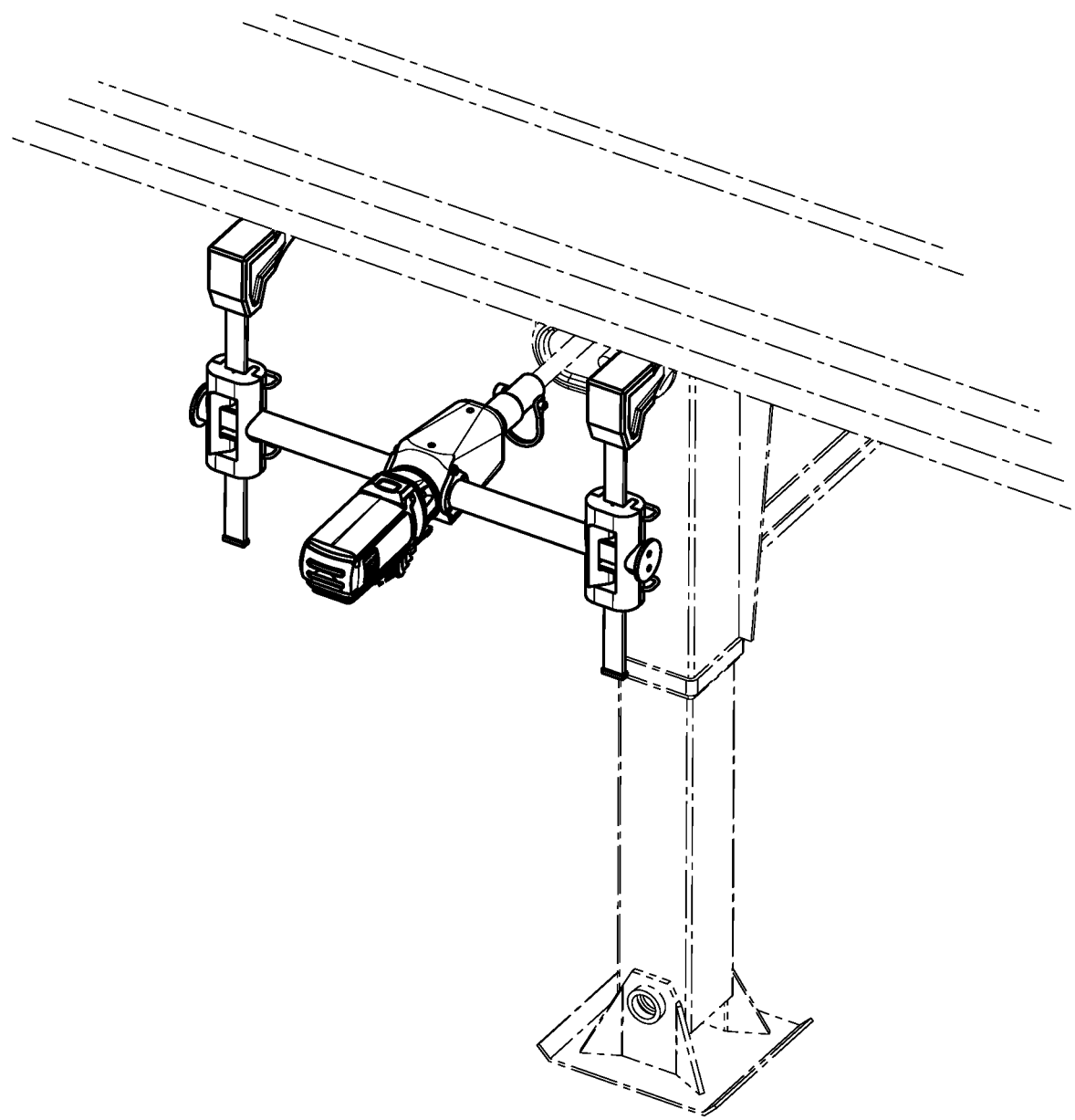
FIG. 1 is a perspective view of a representative sample of a prototype of the motorized means for lowering and raising support legs.
Figure 2:
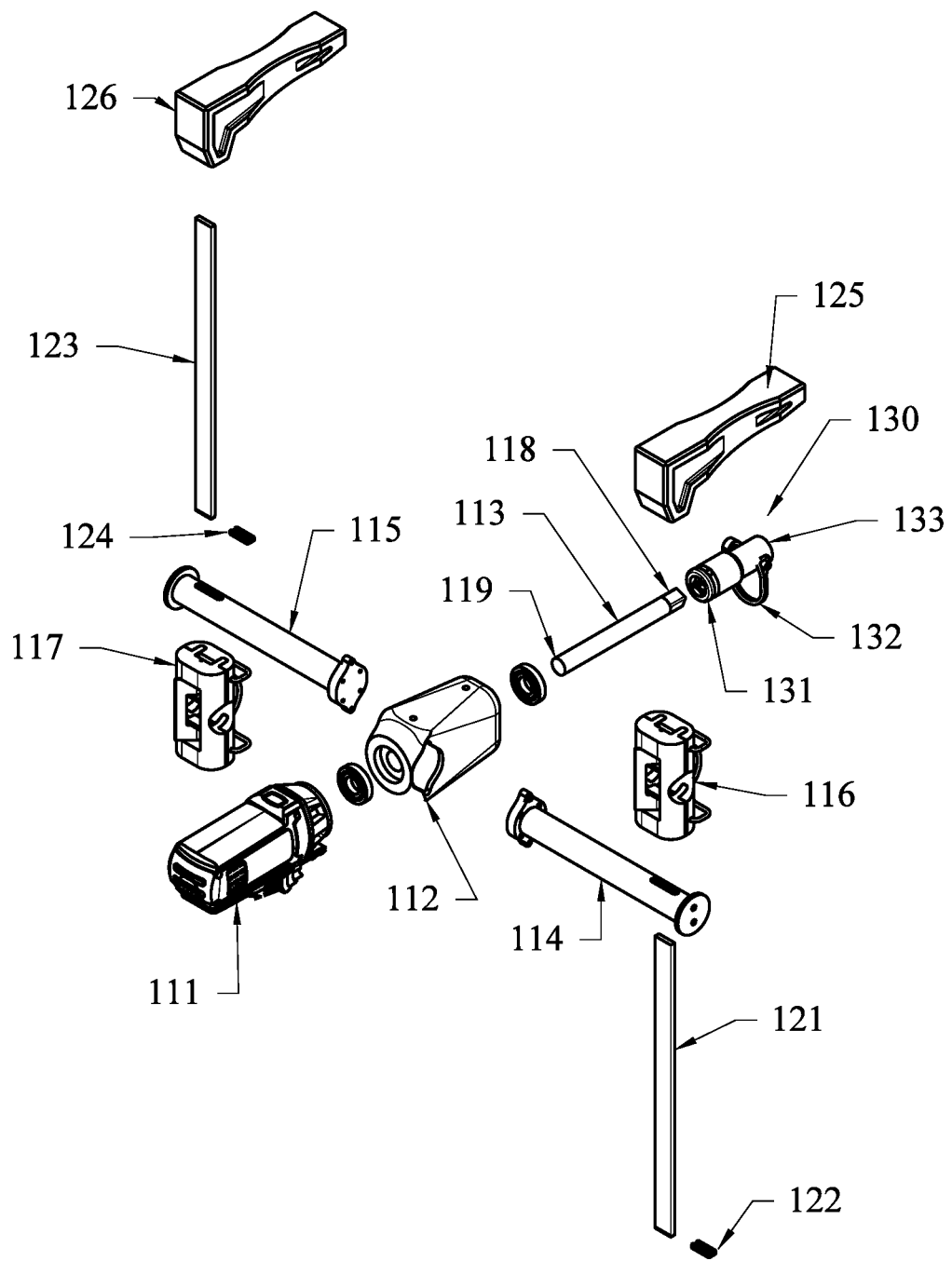
FIG. 2 is an exploded view of the embodiment of FIG. 1, showing the crank shaft coupler's (130) drive shaft coupling end (131) and crank shaft coupling end (133), the drive shaft's (113) shank end (119) and coupler end (118), and the separate bridge arm (126) attached via a riser (123) to the handle (115) of the means of providing rotational force.
Figure 3:
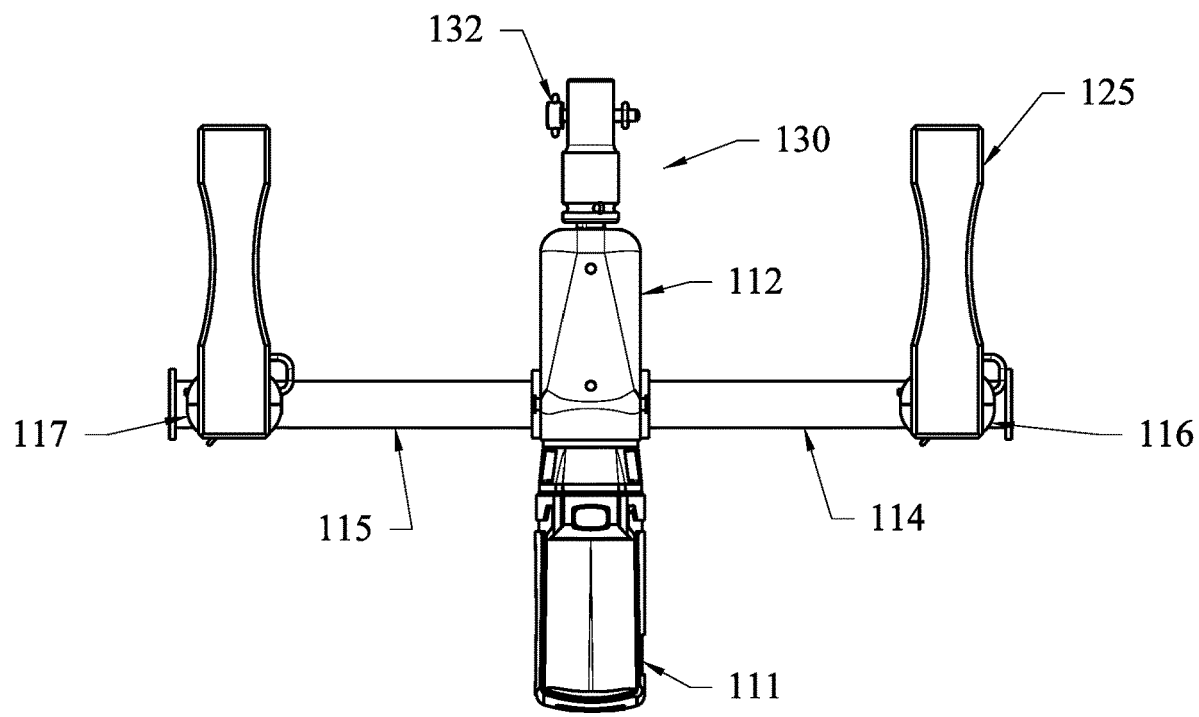
FIG. 3 is a top plan view of the embodiment of FIG. 1.
Figure 4:
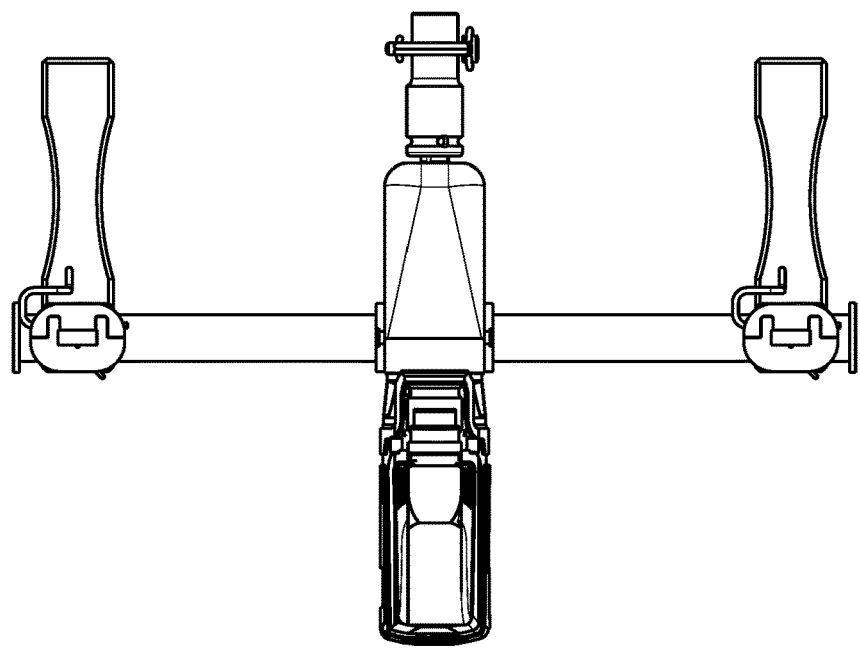
FIG. 4 is a bottom plan view of the embodiment of FIG. 1.

FIG. 1 depicts a perspective view of one representative sample of a motorized torque device having a pair of stabilizer handles (114 and 115)) outstanding approximately 8-12 inches on either side from a central housing (112). In this embodiment, the handles are tubular with a diameter of approximately 1 inch; each has an opposite pair of top and bottom openings for a slot or cavity extending transversely through the distal end of the handle, for snugly accepting insertion of a riser (121 and 123) supporting a bridge (125 and 126) for contacting the load bearing vehicle or a receptacle anchored thereto. Optionally, the end circumference of one or both handles may include an upraised lip or margin, and/or other structure decreasing or preventing hand slippage. There may also be additional structural reinforcement of one or both handles. The handles may be attached to or incorporated within the housing in any manner that satisfies the structural and functional requirements for a stabilizer handle (for operating the torque-producing device) and supporting an extension arm or bridge to the load bearing capacity, to prevent complete rotation of the torque-producing device.

Each riser may be adjustably fixed within the handle by a clamping mechanism (116 and 117) capturing the riser and the handle. Each riser may include a stop (122 and 124) at or near the lowermost end, preventing upward removal of the riser from the apparatus when the clamping mechanism is loosened.

Figure 5:
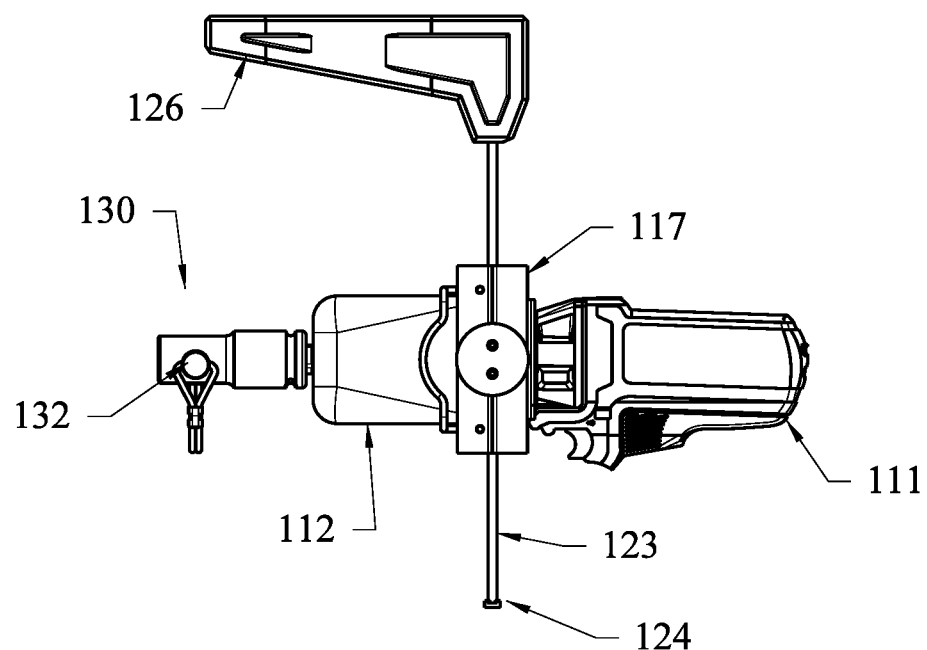
FIG. 5 is a left side elevation view of the embodiment of FIG. 1.
Figure 6:
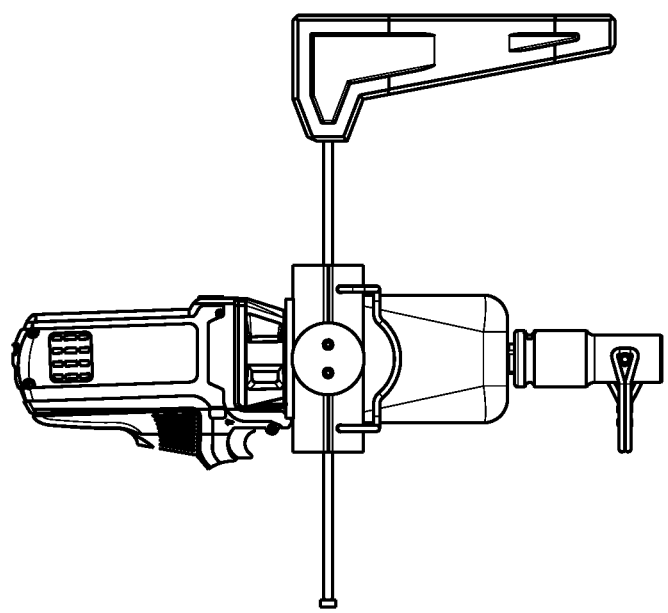
FIG. 6 is a right side elevation view of the embodiment of FIG. 1.
Figure 7:
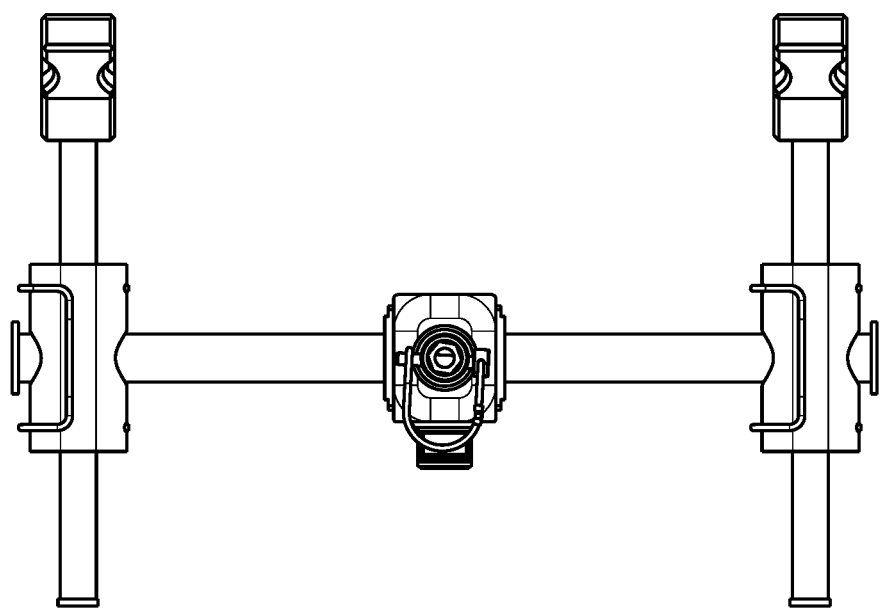
FIG. 7 is a front view of the embodiment of FIG. 1.
Figure 8:
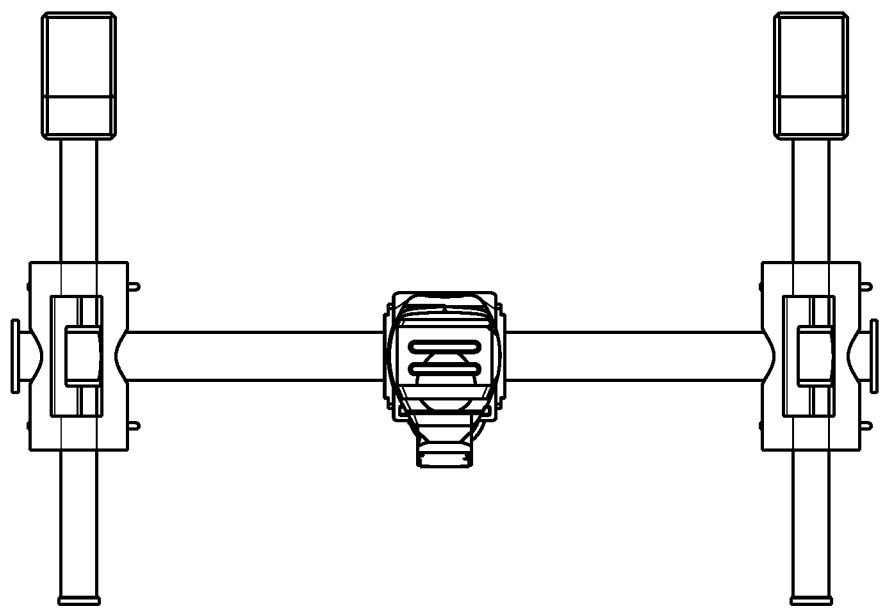
FIG. 8 is rear a view of the embodiment of FIG. 1.

FIGS. 5 and 6 depict a side elevation view of the extension arm configuration discussed in the immediately preceding paragraph. Ideally it should be constructed of rigid material (preferably metal) and be capable of withstanding at least about 50 pounds of pressure/torque. In this embodiment, the slot should be about ¾ inch wide, vertically cut through the end of the handle. The vertical riser of the extension arm is approximately ¾ inch wide and 3/16 inch thick. The lowermost end may include a removable stop-member preventing upward removal of the extension arm. The extension arm may also include a horizontal support extending outwardly from the upper portion or end of the vertical riser. The horizontal support must be long enough to contact the load bearing vehicle (such as the underside of a trailer or the housing of a dolly jack) or insert within a receptacle receiver anchored thereto. The construction of the extension arm must be sufficiently rigid and strong to withstand the torque of the torque-producing device while in use.

Figure 9:
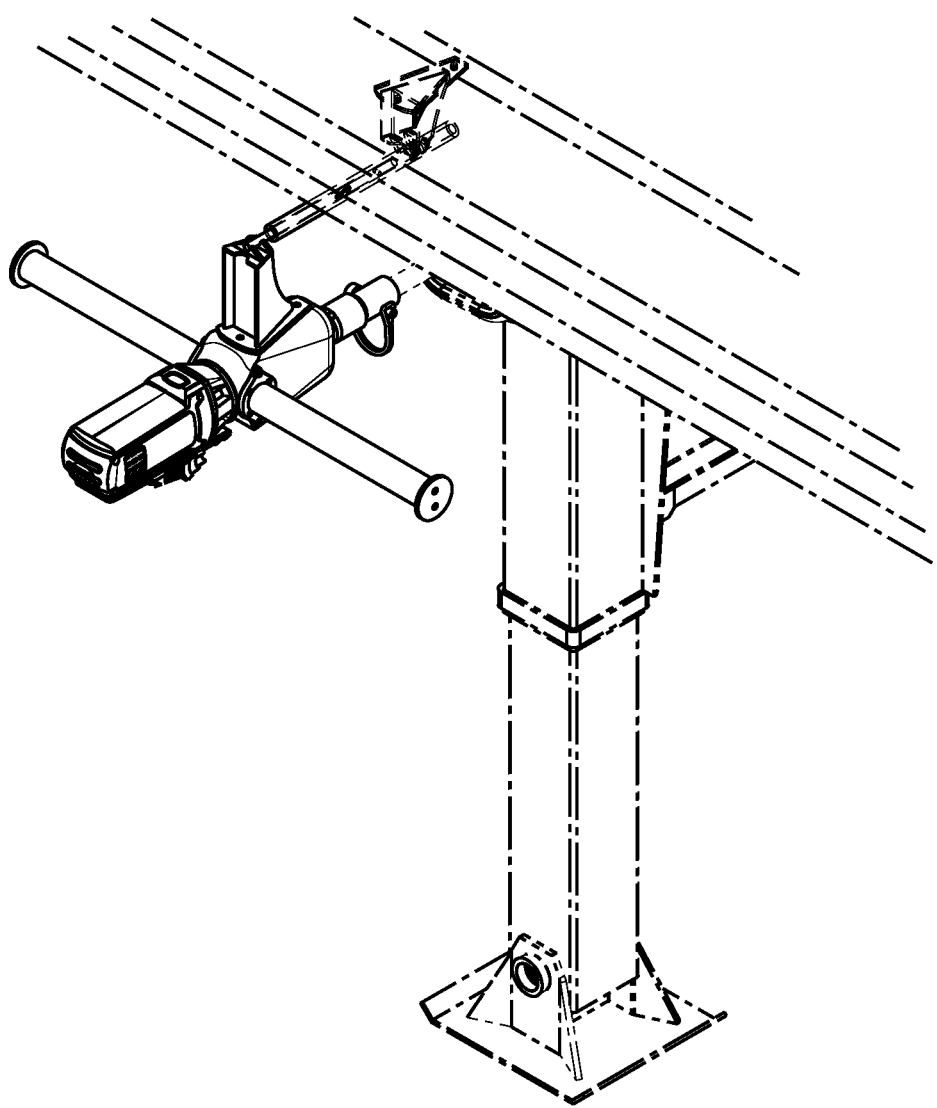
FIG. 9 is a perspective view of representative sample of another embodiment of the motorized means for lowering and raising support legs, essentially having a stabilizer tube mounted beneath a trailer (in phantom), accepting the free end of stabilizer bridge arm/rod extending from the top of the motorized means.

If the load bearing vehicle has a receptacle receiver anchored thereto (as in FIGS. 9-16), ideally the end of the extension arm should snugly insert at least 1-3 inches into the receiver receptacle. FIG. 9 depicts a representative sample of one such receiver receptacle (items 231-235), anchored to the underside of a trailer. The receptacle may be a steel pipe having an interior diameter of at least about 5/16 inch, to accept at least 1 inch (and preferably at least 3 inches) in length of an extension arm having a cylindrical distal end received snugly into the steel pipe.

Figure 18:
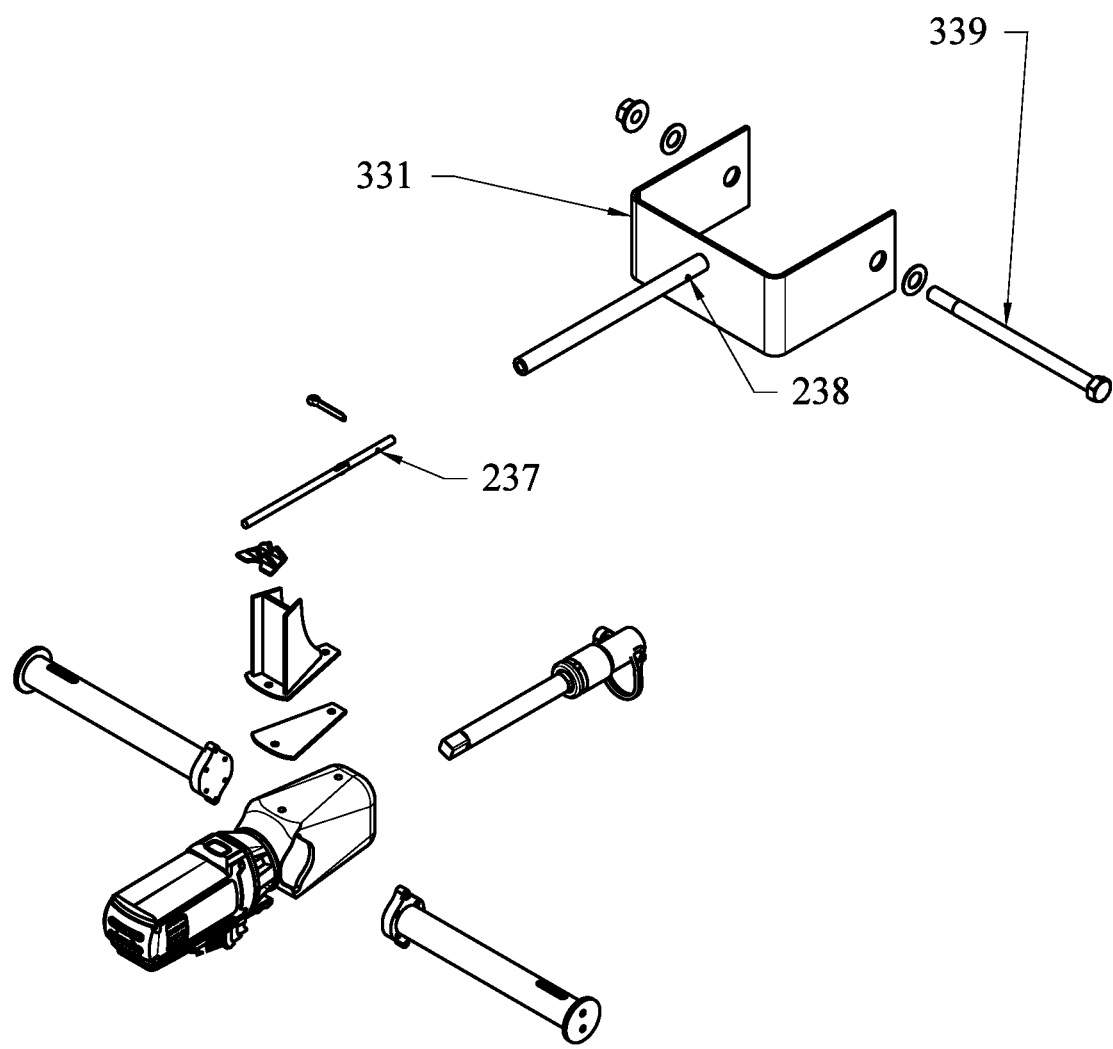
FIG. 18 is an exploded view of the embodiment of FIG. 17, showing the motorized means having a drive shaft with a crank shaft adaptor end and, atop the housing, having a riser with a bracket supporting a stabilizer rod (having a transverse bore, 237) which is telescopically received with a stabilizer cylinder (having a transverse bore, 238) which is anchored to a U-bracket mounted to the jack of a dolly.
Figure 19:
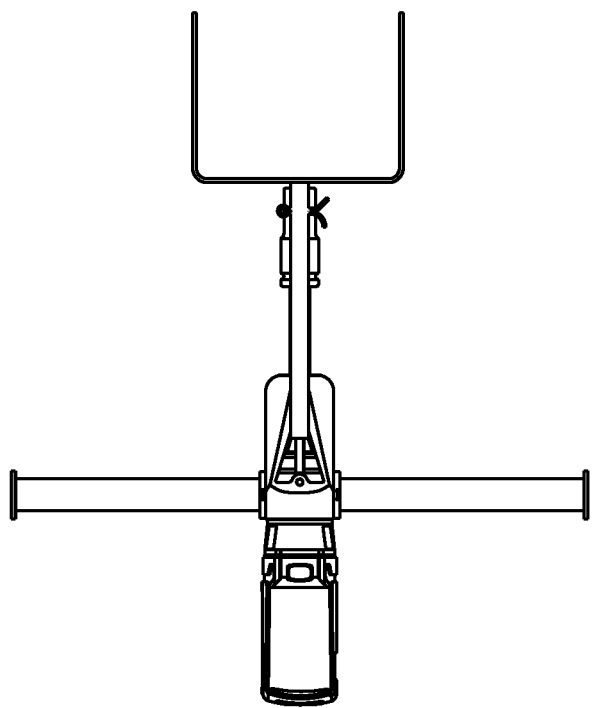
FIG. 19 is a top plan view of the embodiment of FIG. 17.
Figure 20:
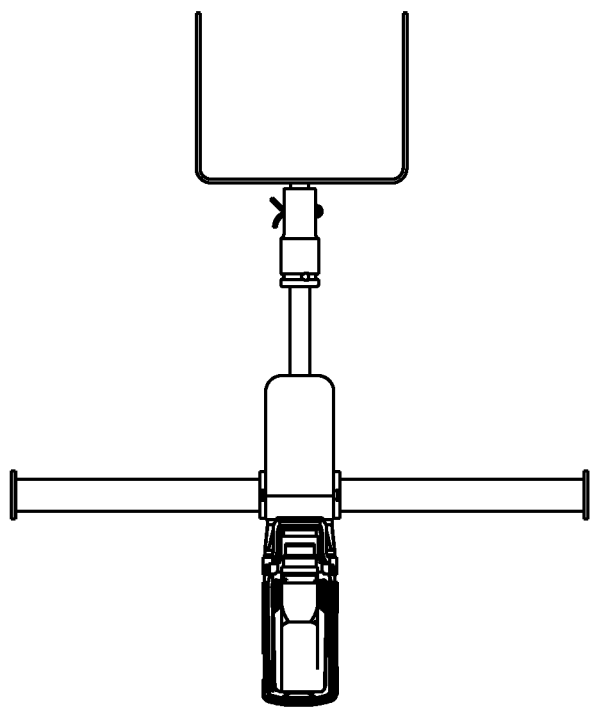
FIG. 20 is a bottom plan view of the embodiment of FIG. 17.
Figure 21:
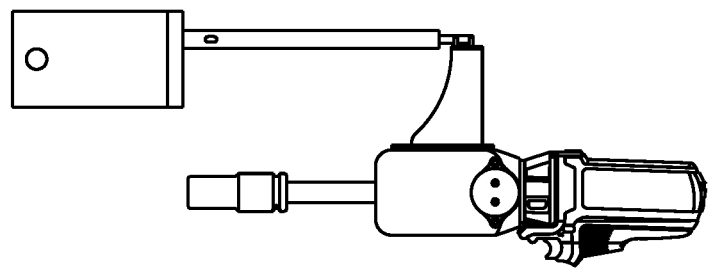
FIG. 21 is a left side elevation view of the embodiment of FIG. 17.
Figure 22:
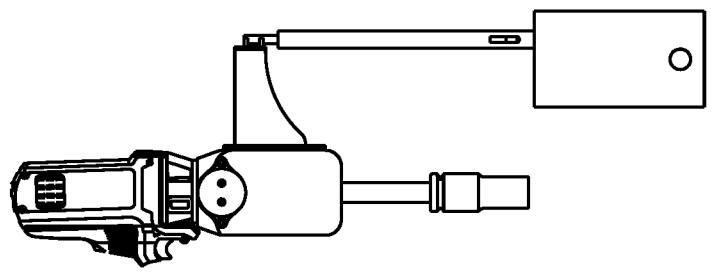
FIG. 22 is a right side elevation view of the embodiment of FIG. 17.
Figure 23:
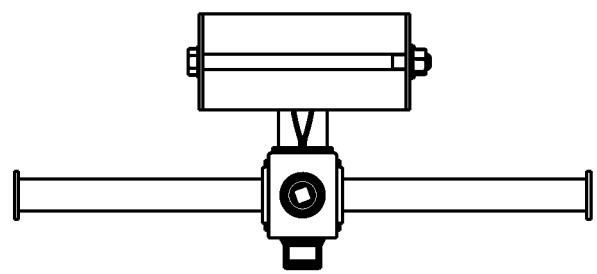
FIG. 23 is a front view of the embodiment of FIG. 17.
Figure 24:
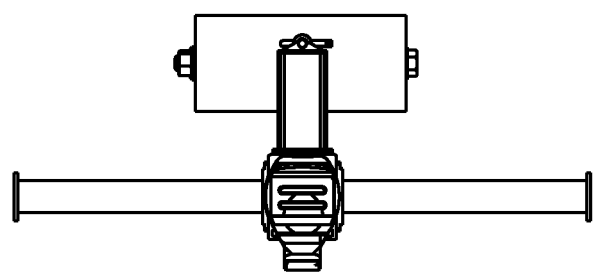
FIG. 24 is a rear view of the embodiment of FIG. 17.
Figure 25:
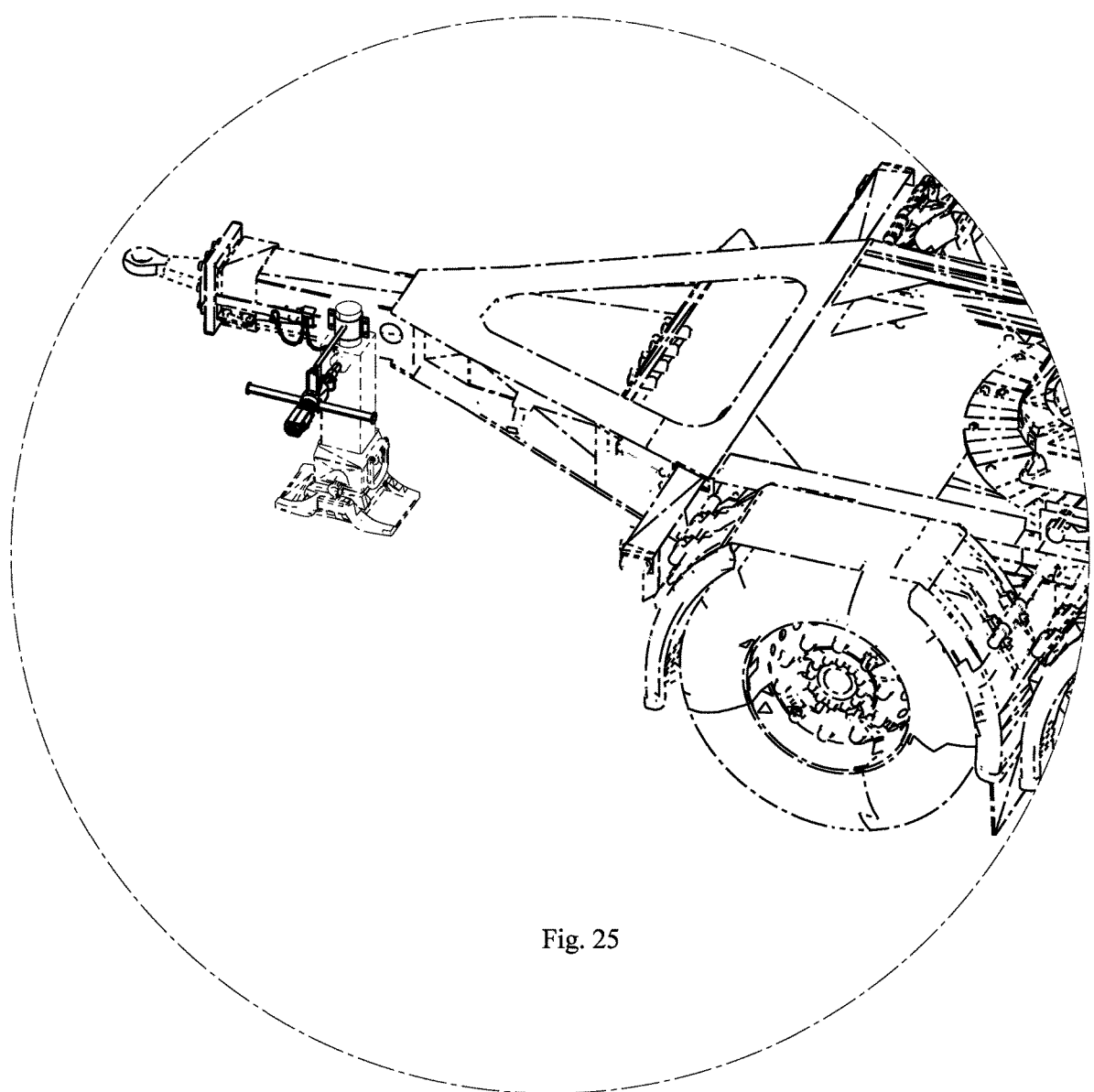
FIG. 25 is a perspective view of representative sample of another embodiment of the motorized means for lowering and raising the front (or nose) of a converter dolly.

FIGS. 17-24 depict a representative sample of a motorized torque device having a crank shaft coupler with a shank end accepted within the chuck of the device, and with its crank shaft coupling end coupled to the crank shaft of a dolly jack positioned for raising or lowering the leg(s) of a dolly used to connect and pull trailers in tandem. FIG. 18 is a partially exploded view depicting an embodiment mountable to a jack having a vertical stand or support having a square or rectangular cross-sectioned configuration. Atop the housing of the apparatus is a riser having a bracket supporting a stabilizer rod (having a transverse bore, 237) for insertion into a stabilizer cylinder (having an aligned transverse bore, 238) supported by a U-bracket (331) mounted to the jack on a dolly. While the crank shaft coupler of the motorized means is mated with the crank shaft of the jack, the stabilizer rod is telescopically received within the stabilizer cylinder and locked in place by the cotter pin inserted through aligned transverse bores of both.

Figure 26:
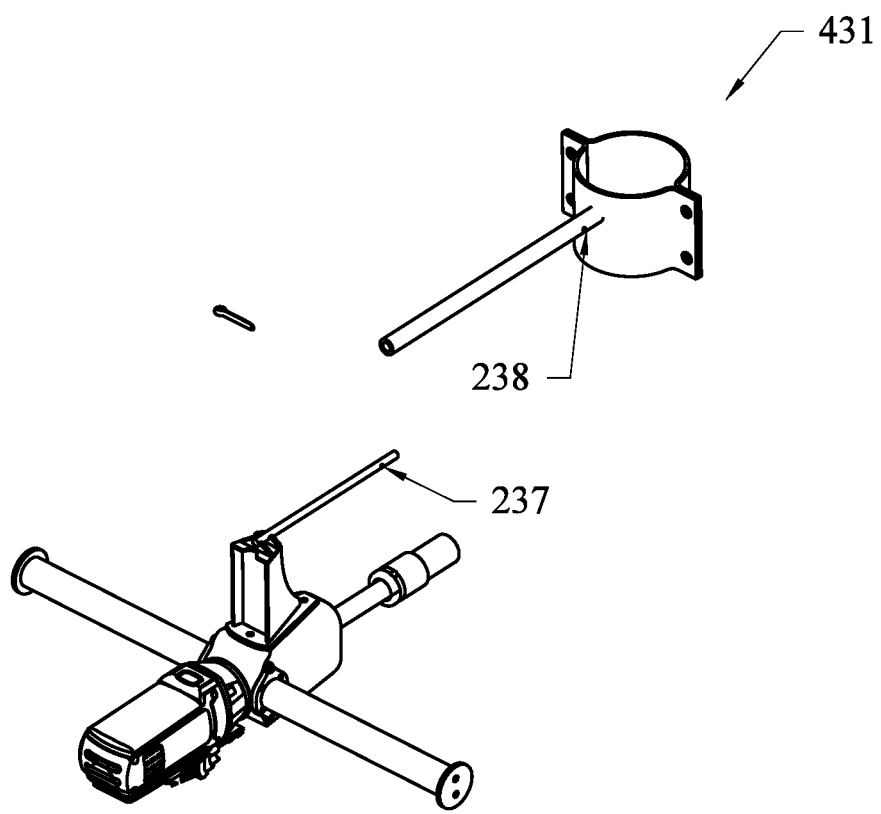
FIG. 26 is an exploded view of the embodiment of FIG. 25, showing the motorized means having a drive shaft with a crank shaft adaptor end and, atop the housing, having a riser with a bracket supporting a stabilizer rod (having a transverse bore) which is telescopically received within a stabilizer cylinder (having a transverse bore) which is anchored to a cylindrical shackle mounted to the jack of a dolly.
Figure 27:
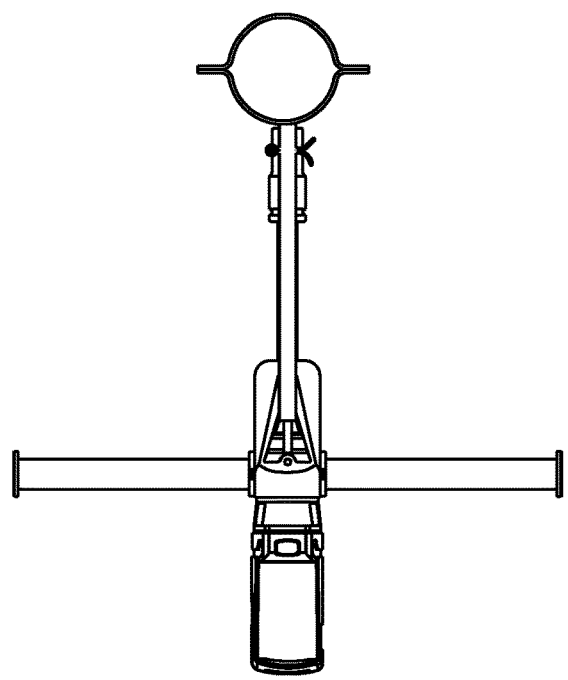
FIG. 27 is a top plan view of the embodiment of FIG. 25.
Figure 28:
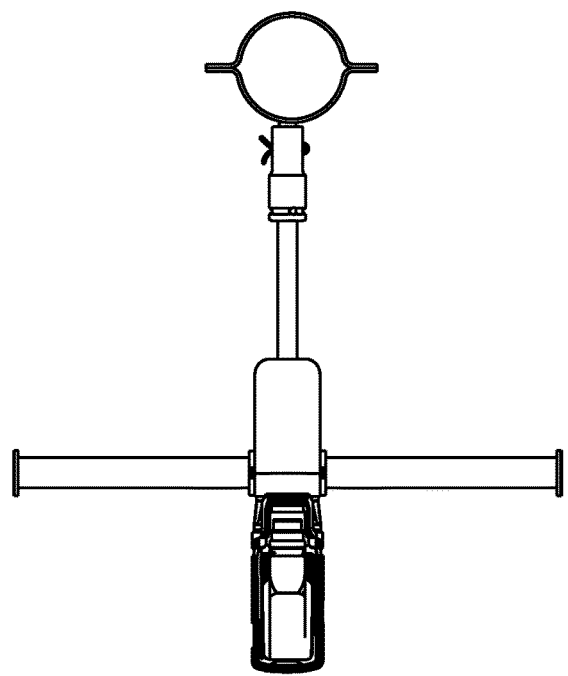
FIG. 28 is a bottom plan view of the embodiment of FIG. 25.
Figure 29:
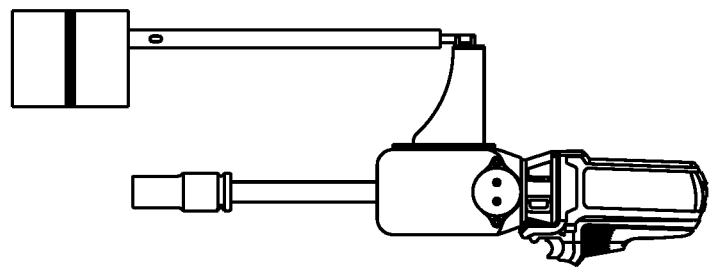
FIG. 29 is a left side elevation view of the embodiment of FIG. 25.
Figure 30:
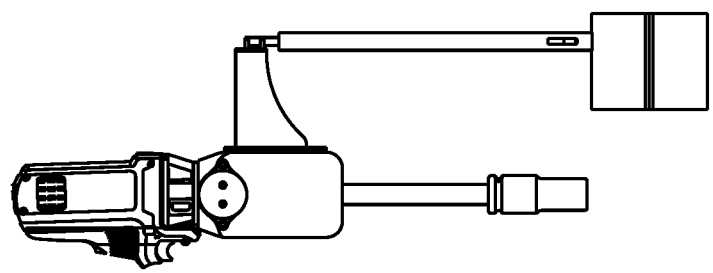
FIG. 30 is a right side elevation view of the embodiment of FIG. 25.
Figure 31:
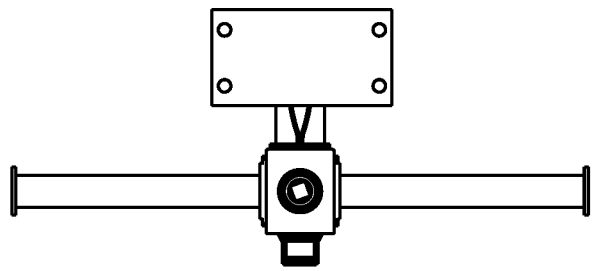
FIG. 31 is a front view of the embodiment of FIG. 25.
Figure 32:
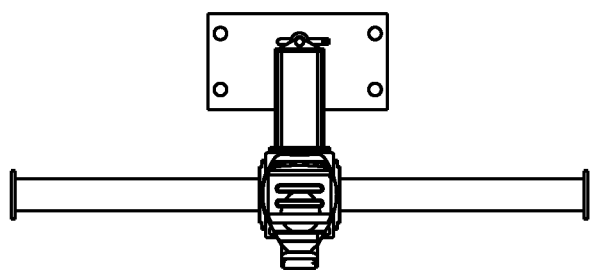
FIG. 32 is a rear view of the embodiment of FIG. 25.
Figure 33:
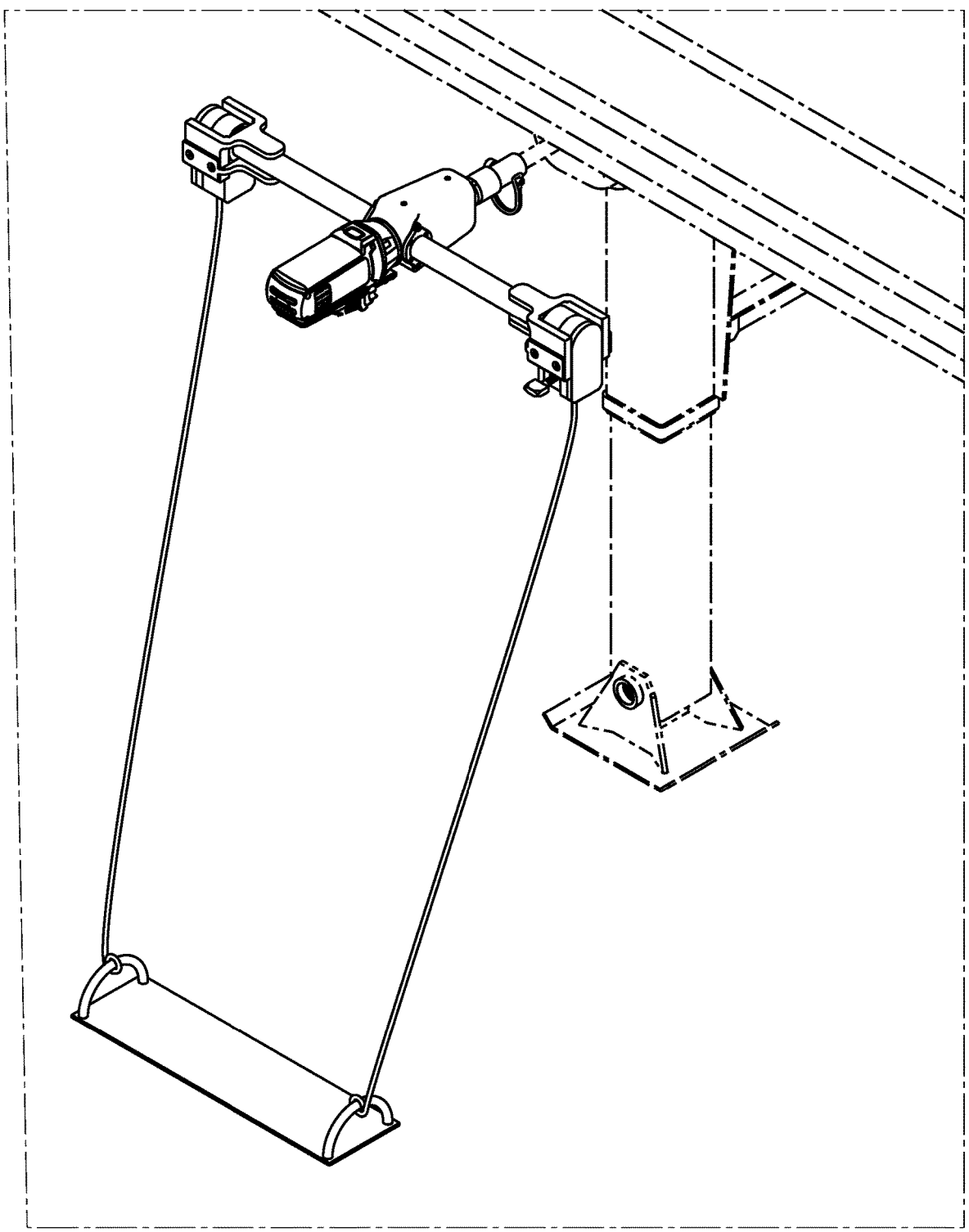
FIG. 33 is a perspective view of representative sample of another embodiment of the motorized means for lowering and raising support legs, stabilized by flexible elongate support members.

FIGS. 25-32 depict an embodiment mountable to a jack having a vertical stand or support having a square or rectangular cross-sectioned configuration. FIG. 26 is a partially exploded view. Atop the housing is a riser having a bracket supporting a stabilizer rod (having a transverse bore) for insertion into a stabilizer cylinder (having an aligned transverse bore) supported by a shackle (431) mounted to the jack on a dolly. While the crank shaft coupler of the motorized means is mated with the crank shaft of the jack, the stabilizer rod is telescopically received within the stabilizer cylinder and locked in place by the cotter pin inserted through aligned transverse bores of both.

FIGS. 33-40 depict an embodiment having the crank shaft coupler coupled with a lock pin to the crankshaft on the trailer. A stabilization means includes cable reels (516 and 517) attached to each end of stabilization handles; the cables (521 and 523) are extended to the ground (and each reel locked), then attached to opposite ends of a foot plate (526) for the user to stand upon while operating the apparatus.

Figure 41:
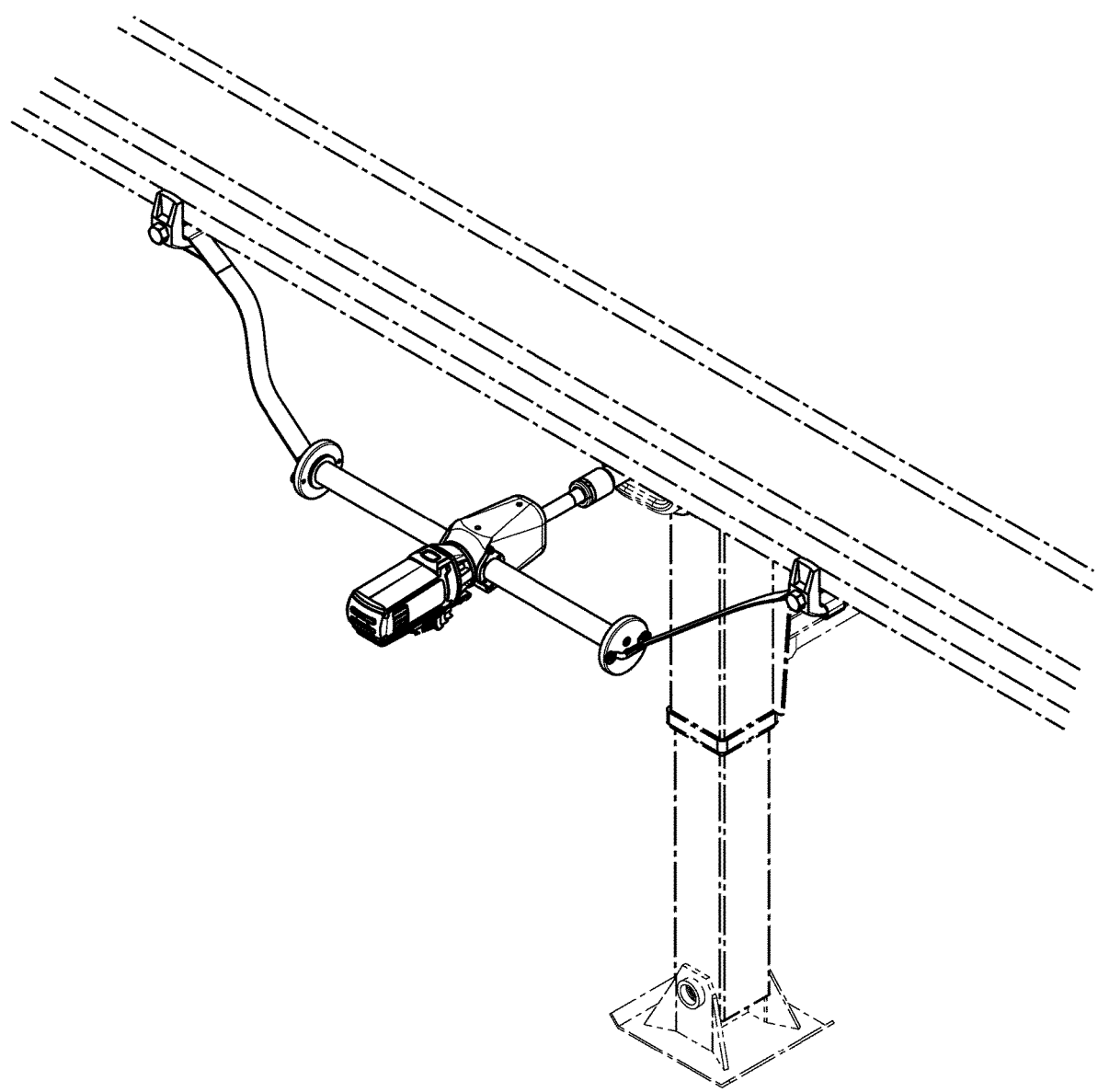
FIG. 41 is a perspective view of representative sample of another embodiment of the motorized means for lowering and raising support legs, stabilized by flexible elongate support members. In this embodiment, adjustable straps replace the stabilizer cables, and are removably attached to the ends of the handles, and the opposite end of each strap is attached to the trailer during use. The trailer-attachment end of one or both straps may include a clamp or other mechanism facilitating anchoring to and removal from the trailer.

FIG. 41 depicts an embodiment similar to that of FIGS. 33-40, except that the cables and foot plate are replaced with straps having adjustable length, which are clamped or otherwise attached to separated places along the trailer so that the straps are taut. Such tautness will prevent rotation of the motorized means, so that all rotary force is directed to the crank shaft.

In one embodiment having a safety mechanism preventing actuation of the torque-producing device before installation of the extension arm(s) or bridge(es), insertion of the extension arms through the slot in the end of both handles closes a circuit, satisfying one of the safety requirements that will ultimately allow actuation of the torque-producing device. Another similar safety requirement may be the similar closing of a circuit by insertion of the end of the extension arm(s) into a receiver receptacle anchored to the load bearing vehicle. One representative sample of such a mechanism is a pair of connectors interposed along an electrical circuit extending along at least one stabilizer handle, separated by the gap caused by the slot-cavity extending vertically through the end of each stabilizer handle; prior to insertion of the vertical riser of an extension arm, that slot-cavity results in an open circuit. Closing this circuit will then allow the motor to operate. Insertion of the vertical riser will close that circuit. (And if use of the motorized torque device is desired without any extension arm, a "slug" (handle-thick segment from an extension arm) may be inserted into the slot-cavity to close the circuit. The "slug" may be removed to re-opening the circuit, when desired.

In another embodiment, the extension arm may include a short length of pipe or rigid tubing centrally mounted on the housing (on the top for example); the pipe may also include an electrical circuit switch that will be closed when the pipe is snugly received within a slightly larger pipe anchored to the load bearing vehicle (underneath a trailer, for example), with its opening extending parallel to the crank shaft of the landing gear legs. The housing-mounted pipe may extend 3-4 inches past the drive shaft of the motorized torque device, and may be inserted into the trailer-anchored pipe preferably a minimum of 2 inches.

Another embodiment includes an L-shaped extension arm attachable to the motorized torque device, preferably one for each handle of a drill. Each extension arm has a horizontal support, and metal vertical riser extending through a slot near the end of the handle; the vertical riser may raise or lower about 12 inches. The vertical riser has a mechanism that will lock it into place on the handle, thus preventing it from lowering without a latch being pulled or depressed. The horizontal support must be in place for the circuit on the vertical riser to be closed, to allow the motor to operate.

Another embodiment includes a bridge between the motorized torque device and the load bearing vehicle, that is primarily a flexible elongate member such as (for example) a cable, cord, metal tape or anything that is not a unitary rigid member but that still satisfies the structural and functional requirements of having sufficient strength to prevent the complete rotation of the motorized torque device. One representative sample includes a cable retractable within a spool, and having a locking mechanism to stop further extension or retraction once the desired length is establishes. The spool (or the connecting end of the flexible elongate member) may be inserted within the handle slot, then allowed to extend down to the ground where it may be anchored while taut. For example, the user may stand on the cable, or stand on each separate cable extending down from both respective handles. Alternatively, the cable end may be staked to the ground if possible, or the user may stand on a foot-plate having each cable end anchored to a respective end of the foot-plate. The spool may be spring loaded, and the cable may have a loop in the free end to accommodate the user's foot. Once extended to the ground, with user's foot in the loop, a lock screw on the body is turned to lock the cable length to prevent it from extending further. The lock must be in place to close the circuit for the motor to operate.

Preferably, the motorized torque device (with the drive shaft coupler having a shank end locked within its chuck) may be temporarily locked into a stable cranking configuration with the crank shaft coupler (with its attachment end locked via a lock pin to the crank shaft for raising and lowering the legs of the load bearing vehicle). Although the coupler end of the drive shaft coupler defines a cavity snugly accepting the adaptor end of the crank shaft coupler (having a non-round cross-section), without any direct locking, this configuration may be locked indirectly by locking the bridge between the motorized torque device and the load bearing vehicle while all elements are ready for use. For example, if the bridge includes a pipe mounted atop the drill housing, received within the lumen of a slightly larger pipe anchored to the underside of the trailer having landing gear legs to be raised or lowered, a lock pin may be inserted through aligned pairs of holes in each pipe.

One particular embodiment of the invention disclosed herein includes (comprises) an apparatus providing rotational power to the crank shaft actuating the lowering and raising of landing gear legs for supporting a trailer or other load bearing vehicle, which preferably may include:

(a) a means for providing rotational force to the crank shaft may include:
  (1) a battery powered motorized drill having a drive shaft having a plurality of rotational directions, and a motor housing;
  (2) a crank shaft coupler adapted for removable attachment to the crank shaft, may include an adaptor end having a non-round cross-section, and an attachment end defining a cavity snugly accepting the crank shaft and including a pair of apertures aligned with a transverse bore through the crank shaft through which an anchor pin is inserted; and
  (3) a drive shaft coupler for coupling the drive shaft to the crank shaft coupler, may include a shank end tightly accepted within the chuck of the drill, and a coupler end defining a cavity snugly accepting the adaptor end having a non-round cross-section; and
(b) a stabilization means may include a bridge between the motor housing and the trailer, the housing including at least one lateral stabilizer handle having a distal end supporting a bridge arm for contacting the trailer and preventing rotation of the drill.

FIGS. 9-16 depict an embodiment having one part of the stabilizer system mounted to the trailer and the cooperating part of the stabilizer system upstanding from the top of the housing for the motorized means for providing rotational force to the crank shaft. Atop the housing is a riser (221) having a bracket (222) supporting a stabilizer rod (223) for insertion into a stabilizer cylinder (233) supported by as bracket (232) of a mount (231) downstanding from the underside of a trailer. The stabilizer rod is telescopically received within the stabilizer cylinder, while the crank shaft coupler of the motorized means is mated with the crank shaft and locked in place by the fastener pin inserted through aligned transverse bores of both.

In other embodiments, the housing preferably includes an opposite pair of lateral stabilizer handles, each having a distal end supporting a separate bridge arm for contacting the trailer and preventing rotation of the drill.

Another particular embodiment of the invention disclosed herein includes (comprises) an apparatus providing rotational power to the crank shaft actuating the lowering and raising of landing gear legs for supporting a trailer or other load bearing vehicle, which may include:

(a) a means for providing rotational force to the crank shaft may include:
  (1) a battery powered motorized drill having a drive shaft having a plurality of rotational directions, and a motor housing;
  (2) a crank shaft coupler adapted for removable attachment to the crank shaft, may include an adaptor end having a non-round cross-section, and an attachment end defining a cavity snugly accepting the crank shaft and including a pair of apertures aligned with a transverse bore through the crank shaft through which an anchor pin is inserted; and
  (3) a drive shaft coupler for coupling the drive shaft to the crank shaft coupler, may include a shank end tightly accepted within the chuck of the drill, and a coupler end defining a cavity snugly accepting the adaptor end having a non-round cross-section; and
(b) a stabilization means may include a bridge between the motor housing and the trailer, the housing including at least one lateral stabilizer handle having a distal end supporting an extension arm, the bridge may include a tube mounted on the trailer and having an end accepting insertion of the extension arm and preventing rotation of the drill.

In other embodiments, the housing preferably includes an opposite pair of lateral stabilizer handles, each having a distal end supporting a separate extension arm, each bridge may include a tube mounted on the trailer and having an end accepting insertion of the extension arm and preventing rotation of the drill.

Besides the apparatus, the invention disclosed herein includes a method of using the apparatus. In use, after any crank handle is removed from the crank shaft actuating the lowering and raising of landing gear legs, the attachment end of the crank shaft coupler is slid over the crank shaft, with the holes in the attachment end aligned with the anchor-pin holes of the crank shaft. Re-inserting the anchor pin will anchor the crank shaft coupler to the crank shaft. Then the shank of the drive shaft couple is secured within the chuck of a battery powered drill having appropriate torque capacity, and the coupler end is slid over the adaptor end of the crank shaft coupler. Since the coupler end defines a cavity having a non-round cross section that will snugly accept the adaptor end having the complimentary non-round cross section, activation of the drill will cause rotation of the drive shaft coupler, which will cause rotation of the crank shaft coupler, which will rotate the crank shaft so that the landing gear wheels will raise or lower (depending upon the direction of rotation of the drill).

Since there usually is resistance to raising and lowering the landing gear legs, it is advisable to stabilize the drill so that its motorized rotation results in rotation of the crank shaft rather than rotation of the drill. Accordingly, if the drill is equipped with a stabilizer handle (outstanding from the housing at an angle not substantially parallel to the crank handle), the free end of the handle supports a bridge arm that essentially extends from the tip of the handle and into contact with the trailer (typically the underside of the trailer, above the crank handle). The bridge prevents the drill from rotating, thereby assuring that the rotation of the drill's drive shaft is imparted to the crank shaft. If the drill is equipped with a pair of stabilizer handles (typically outstanding from opposite sides of the housing, each at an angle not substantially parallel to the crank handle), the free end of each handle supports a bridge arm that essentially extends from the tip of the handle and into contact with the trailer. Both bridges essentially provide a double "chocking" of the drill and the trailer, thereby assuring that the rotation of the drill's drive shaft is imparted to the crank shaft.

The drill preferably has a standard connector (¼, ⅜, ½) or chuck on which the socket will be attached. Also preferred is an on/off trigger switch, and/or a switch for variable speed control, and/or a switch directing the direction of rotation of the drill. If the drill has no variable speed capability, then switch for high/low speed.

It would be best if the drill could be battery powered, since portability is desired. Other approaches could be used but have limitations making them less desirable.

Another embodiment involves application with a dolly jack, which is used to raise or lower the front end of a wheeled dolly used to support the front end of a trailer while it is being attached to and moved with another trailer in tandem. A dolly jack is typically a vertical cylinder or jack-post that raises and lowers the front end of a converter dolly (also sometimes called converter gear). It is usually permanently attached to the dolly and, when the dolly is not being used, its vertical support is pivoted into contact with the ground. The contact is made typically with a foot, or with a wheel allowing for easier movement of the dolly. The handle of the jack is typically manually cranked by the user to raise/lower the front of the dolly for connecting to a trailer.

In this embodiment, the crank handle on the crank shaft of the jack will be removed, and replaced with the same type of crank shaft coupler described hereinabove. And as above, the crank shaft coupler may be essentially locked onto the crank shaft by insertion of a lock pin through holes in the crank shaft coupler that are aligned with a bore extending transversely through the crank shaft.

An attachment is bolted onto the shaft of the dolly jack. This attachment will look very similar to a hose clamp or a u-bolt mechanism with a tube attached to it. This tube will have a ⅛ inch hole in it ½ inch from the clamping mechanism. #11 attachment above is inserted into the tube clamped onto the dolly crank which will close the circuit.

A pin will be inserted through both the tube on the motor housing and the dolly crank tube. This ensures a positive placement of the drive mechanism.

One particular embodiment includes a method of using the device, comprising the steps of:

(a) attaching the attachment end of the crank shaft coupler to the crank shaft (with or without insertion of a lock pin through the holes in the attachment end that are aligned with the transverse bore through the end of the crank shaft;

(b) enclosing the shank end of the drive shaft coupler tightly within the chock of the drill;

(c) coupling the coupler end of the drive shaft coupler and the adaptor end of the crank shaft coupler; and (d) anchoring the free end of any bridge onto the load bearing vehicle.

In use, the user couples the crank shaft coupler to the crank shaft, then actuates the motorized rotary means to rotate the crank shaft in whichever direction will result in the desired raising or lowering of the legs of the load bearing vehicle. As an additional safety precaution, the crank shaft coupler may be locked onto the crank shaft, using a lock pin. As an alternative to (or in conjunction with) the locking of the crank shaft coupler to the crank shaft, the user may insert the stabilizer rod into the stabilizer cylinder anchored to the trailer, and lock into place with a cotter pin through the aligned holes in both. Or the user may extend the stabilizer cables or straps to the appropriate anchor point on the ground or the trailer. As a further safety precaution, the user may activate a fail-safe means for preventing actuation of the means for providing rotational force to the crank shaft, until the locked coupling and/or the stabilizing connection occurs. For example, the fail-safe means may include a switch opening an electrical circuit which is closed by the locked coupling and/or stabilizing connection.

I claim:

1. An apparatus providing rotational power to a crank shaft actuating the lowering and raising of legs for supporting a load bearing vehicle, comprising:

(a) a portable means for providing rotational force to the crank shaft comprising a motorized torque device having a drive shaft and a motor housing, and a crank shaft coupler having a crank shaft coupling end adapted for removable coupling with a free end of the crank shaft, said crank shaft coupling end further comprising a pair of apertures aligned with a transverse bore through the free end of the crank shaft through which a lock pin is inserted for locked coupling;

(b) a means for preventing rotation of said motorized torque device comprising a bridge between said motorized torque device and the load bearing vehicle, comprising a lateral brace member having a distal portion supporting at least one bridge member extending to engagement with the load bearing vehicle and preventing rotation of said motorized torque device; and (c) a fail-safe means for preventing actuation of said means for providing rotational force to the crank shaft, until said locked coupling occurs.

2. An apparatus described in claim 1 hereinabove, said bridge member comprising a rigid bridge member.

3. An apparatus described in claim 1, said crank shaft coupler further comprising a drive shaft coupling end adapted for removable coupling with the drive shaft.

4. An apparatus described in claim 3, wherein the drive shaft comprises a distal end having a non-round cross-section, and the drive shaft coupling end of the crank shaft coupler defines a cavity snugly accepting the distal end of the drive shaft, and the crank shaft coupling end of the crank shaft coupler defines a cavity snugly accepting the free end of the crank shaft for crank shaft coupling.

5. An apparatus described in claim 4, said distal end having a cross-section selected from the group consisting of an oval, triangular, square, rectangular, pentagonal, hexagonal, octagonal or other polygonal cross-section, or combinations thereof.

6. An apparatus described in claim 3, said motorized torque device comprising a drill having a chuck end rotationally powered by a drill motor, said drive shaft coupling end of said crank shaft coupler comprising a shank end tightly confined within the chuck, and the crank shaft coupling end of the crank shaft coupler defining a cavity snugly accepting said free end of the crank shaft.

7. An apparatus described in claim 1, said motorized torque device comprising a drill having a plurality of rotational speeds and directions of torqueing, and powered by means selected from the group consisting of battery, solar, hydraulic, water pressure, air pressure, or steam.

8. An apparatus described in claim 1, said bridge further comprising a rigid support member mounted on said motorized torque device and said lateral brace member having said distal portion supporting said at least one bridge member comprising a rigid bridge arm extending to engagement with the load bearing vehicle.

9. An apparatus described in claim 8, said rigid bridge arm having a distal end, said means for preventing rotation of said motorized torque device further comprising a bridge receptacle anchored to said load bearing vehicle and having an opening sized to receive said bridge arm distal end.

10. An apparatus described in claim 1, said motorized torque device including an opposite pair of lateral brace members, each having a distal portion supporting a separate bridge arm extending to engagement with the load bearing vehicle and preventing rotation of said motorized torque device.

11. An apparatus described in claim 1, said bridge comprising a flexible elongate support member mounted on said motorized torque device and extending to the load bearing vehicle or to the ground for anchoring thereto.

12. An apparatus described in claim 11, said motorized torque device including at least one lateral brace member having a distal portion supporting a flexible elongate support member attached thereto and extending to the ground or to the load bearing vehicle for anchoring thereto and preventing rotation of said motorized torque device.

13. An apparatus described in claim 12, said motorized torque device including an opposite pair of lateral brace members, each having a distal portion supporting a separate flexible elongate support member attached thereto and extending to the ground or to the load bearing vehicle for anchoring thereto and preventing rotation of said motorized torque device.

14. An apparatus described in claim 1, said fail-safe means for preventing actuation of said motorized torque device comprising an open electrical circuit which is closed by said locked coupling.

15. An apparatus providing rotational power to a free end of a crank shaft actuating the lowering and raising of legs for supporting a load bearing vehicle, comprising:
   (a) a means for providing rotational force to the crank shaft comprising a battery powered motorized drill having a drive shaft with a chuck end and having a plurality of rotational directions, and a motor housing;
   (b) a crank shaft coupler comprising a shank end tightly confined within the chuck, and a crank shaft coupling end defining a cavity snugly accepting said free end of the crank shaft, said crank shaft coupling end further comprising a pair of apertures aligned with a transverse bore through the free end of the crank shaft through which a lock pin is inserted for locked coupling;
   (c) a means for preventing rotation of said means for providing rotational force to the crank shaft, comprising a bridge between said motorized drill and the load bearing vehicle and including at least one lateral brace member having a distal end supporting a bridge arm for contacting the load bearing vehicle and preventing rotation of said drill; and
   (d) a fail-safe means for preventing actuation of said drill, comprising an open electrical circuit which is closed by said locked coupling.

16. An apparatus described in claim 15, said motorized drill further comprising an opposite pair of lateral brace members, each having a distal end supporting a separate bridge arm.

17. An apparatus described in claim 15, said bridge comprising a flexible elongate support member mounted on said motorized torque device and extending to the load bearing vehicle or to the ground for anchoring thereto.

\* \* \* \* \*